(12) United States Patent
Ko et al.

(10) Patent No.: US 11,527,077 B2
(45) Date of Patent: Dec. 13, 2022

(54) ADVANCED DRIVER ASSIST SYSTEM, METHOD OF CALIBRATING THE SAME, AND METHOD OF DETECTING OBJECT IN THE SAME

(71) Applicant: SAMSUNG ELECTRONICS CO., LTD., Suwon-si (KR)

(72) Inventors: Sangsoo Ko, Suwon-si (KR); Byeoungsu Kim, Suwon-si (KR); Jaegon Kim, Suwon-si (KR); Sanghyuck Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 16/791,279

(22) Filed: Feb. 14, 2020

(65) Prior Publication Data
US 2020/0372265 A1 Nov. 26, 2020

(30) Foreign Application Priority Data
May 20, 2019 (KR) .................. 10-2019-0058671

(51) Int. Cl.
| | |
|---|---|
| *G06V 20/58* | (2022.01) |
| *G06K 9/62* | (2022.01) |
| *G06T 7/73* | (2017.01) |
| *G06T 7/593* | (2017.01) |
| *G06T 3/40* | (2006.01) |
| *G06N 3/08* | (2006.01) |
| *G06V 20/56* | (2022.01) |

(52) U.S. Cl.
CPC .............. *G06V 20/58* (2022.01); *G06K 9/629* (2013.01); *G06K 9/6289* (2013.01); *G06N 3/08* (2013.01); *G06T 3/4053* (2013.01); *G06T 7/593* (2017.01); *G06T 7/75* (2017.01); *G06V 20/588* (2022.01); *G06T 2210/12* (2013.01)

(58) Field of Classification Search
CPC ........ G06V 20/58; G06V 20/588; G06T 7/75; G06T 7/593; G06T 3/4053; G06T 2210/12; G06K 9/6289; G06K 9/629; G06N 3/08
See application file for complete search history.

(56) References Cited

U.S. PATENT DOCUMENTS

| | | | |
|---|---|---|---|
| 9,542,521 B2 | 1/2017 | He et al. | |
| 9,760,806 B1 | 9/2017 | Ning et al. | |
| 9,914,212 B2 | 3/2018 | Wettels | |
| 10,083,523 B2 | 9/2018 | Versace et al. | |
| 2011/0255741 A1* | 10/2011 | Jung | G06V 20/58 |
| | | | 382/103 |

(Continued)

*Primary Examiner* — Qun Shen
(74) *Attorney, Agent, or Firm* — F. Chau & Associates, LLC

(57) ABSTRACT

An advanced driver assist system (ADAS) includes a processing circuit and a memory storing instructions executable by the processing circuit. The processing circuit executes the instructions to cause the ADAS to: obtain, from a vehicle, a video sequence including a plurality of frames captured while driving the vehicle, where each of the frames corresponds to a stereo image including a first viewpoint image and a second viewpoint image; determine depth information in the stereo image based on reflected signals received while driving the vehicle; fuse the stereo image and the depth information to generated fused information, and detect at least one object included in the stereo image based on the fused information.

17 Claims, 24 Drawing Sheets

(56) References Cited

U.S. PATENT DOCUMENTS

| | | |
|---|---|---|
| 2017/0011281 A1 | 1/2017 | Dijkman et al. |
| 2017/0032676 A1* | 2/2017 | Mesmakhosroshahi ..................... G06V 40/103 |
| 2017/0124409 A1 | 5/2017 | Choi et al. |
| 2017/0206436 A1 | 7/2017 | Schiffmann |
| 2018/0060725 A1 | 3/2018 | Groh et al. |
| 2019/0361456 A1* | 11/2019 | Zeng ..................... B60W 50/14 |
| 2020/0064483 A1* | 2/2020 | Li ......................... G01S 7/4026 |
| 2020/0158514 A1* | 5/2020 | Moloney ................. G06T 19/00 |
| 2020/0293064 A1* | 9/2020 | Wu ....................... G06V 20/597 |
| 2020/0294257 A1* | 9/2020 | Yoo ....................... G06N 3/0454 |

* cited by examiner

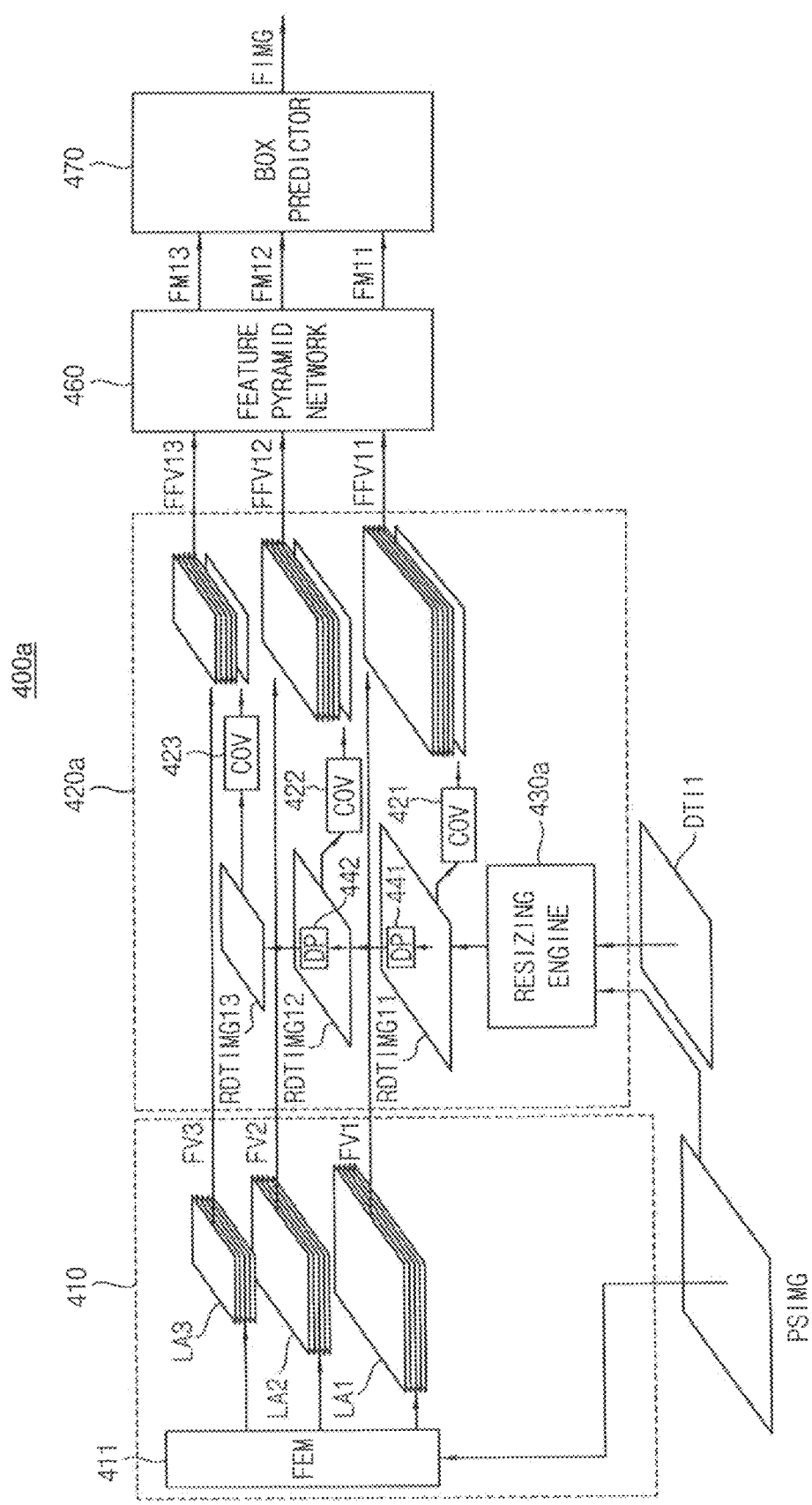

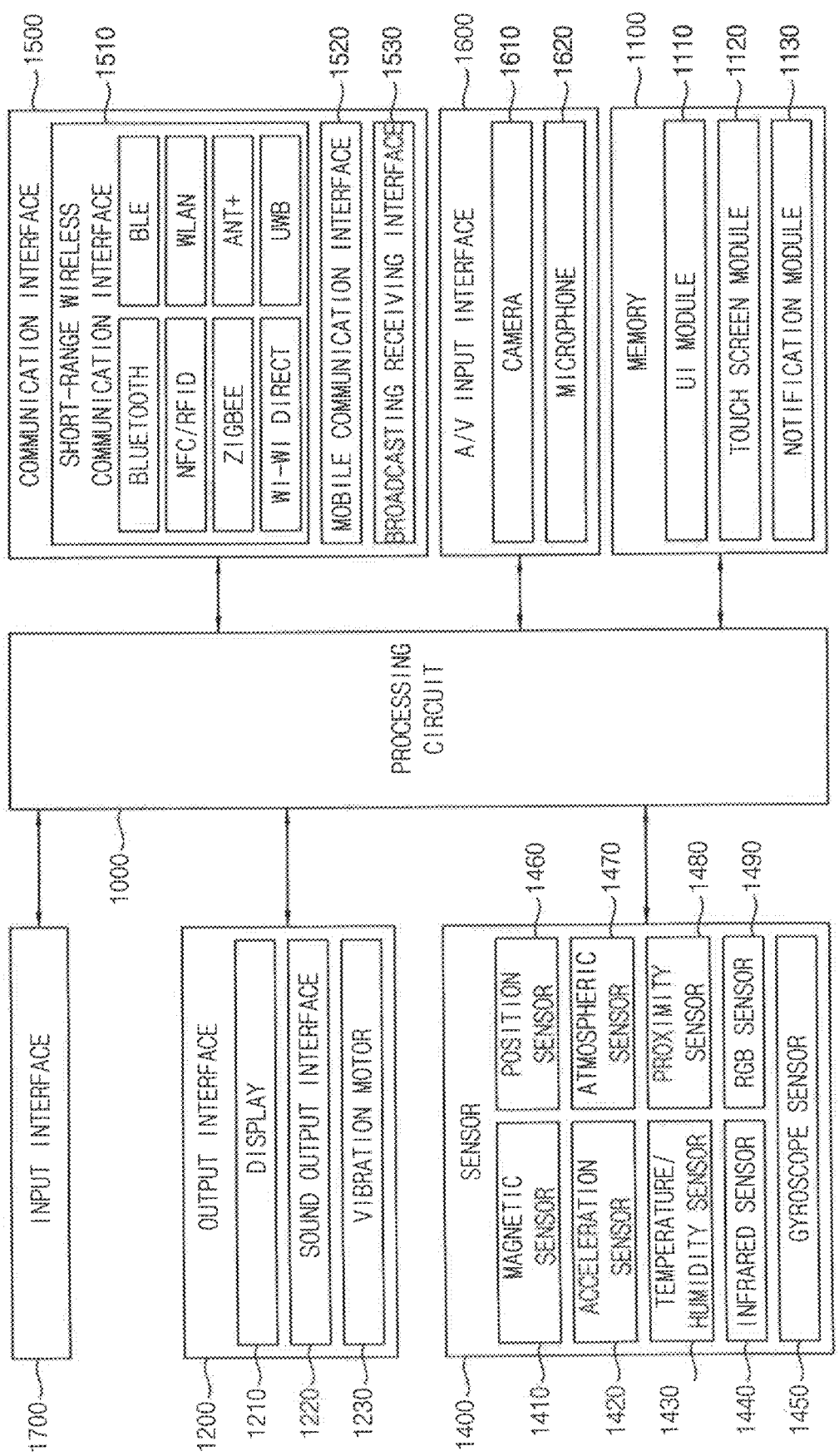

ADVANCED DRIVER ASSIST SYSTEM, METHOD OF CALIBRATING THE SAME, AND METHOD OF DETECTING OBJECT IN THE SAME

CROSS-REFERENCE TO RELATED APPLICATION

This U.S. non-provisional patent application claims priority under 35 USC § 119 to Korean Patent Application No. 10-2019-0058671, filed on May 20, 2019, in the Korean Intellectual Property Office (KIPO), the disclosure of which is incorporated by reference in its entirety herein.

BACKGROUND

1. Technical Field

Exemplary embodiments of the inventive concept relate generally to object detection, and more particularly to advanced driver assist system (ADAS) capable of detecting objects while driving a vehicle, a method of calibrating the ADAS and a method of detecting objects using the ADAS.

2. Discussion of Related Art

An advanced driver assist system (ADAS) is a system that assists or supports a driver in driving a vehicle. The ADAS may provide functions such as automatic lane centering, blind spot warning, and automatic emergency braking.

SUMMARY

At least one exemplary embodiment of the inventive concept is directed to an advanced driver assist system (ADAS) capable of capturing images, receiving signals from a plurality of sensors, fusing information of the images and information of the signals to generate fused information, and detecting an object from the fused information.

At least one exemplary embodiment of the inventive concept is directed to a method of calibrating the ADAS for enhancing quality of the information of the images such as depth images.

At least one exemplary embodiment of the inventive concept is directed to a method of controlling an ADAS that includes fusing signals from a plurality of sensors to generate fused information and detecting objects using the fused information.

According to an exemplary embodiment of the inventive concept, an advanced driver assist system (ADAS) includes a processing circuit and a memory storing instructions executable by the processing circuit. The processing circuit executes the instructions to cause the ADAS to: capture, from a vehicle, a video sequence including a plurality of frames while driving the vehicle, where each of the frames corresponds to a stereo image including a first viewpoint image and a second viewpoint image; determine depth information in the stereo image based on reflected signals received while driving the vehicle; fuse the stereo image and the depth information to generated fused information; and detect least one object included in the stereo image from the fused information.

According to an exemplary embodiment of the inventive concept, there is provided a method of calibrating an advanced driver assist system (ADAS) to detect an object. The method includes: training a feature extractor in an object detection module of a processing circuit in the ADAS with a first data set associated with object classifying; training a feature pyramid network and a box predictor in the object detection module with a second data set associated with object detection; retraining the feature pyramid network and the box predictor based on depth information and synchronized sensing data associated with at least one trained object; performing fine-tuning on the feature extractor, the feature pyramid network and the box predictor based on the synchronized sensing data; and storing an inference model of the object detection module in a memory coupled to the processing circuit, the inference model being obtained as a result of the fine-tuning.

According to an exemplary embodiment of the inventive concept, there is provided a method of detecting an object in an ADAS. The method includes: capturing, by a first sensor of a vehicle, a video sequence including a plurality of frames while driving the vehicle, where each of the frames corresponds to a stereo image including a first viewpoint image and a second viewpoint image; determining depth information in the stereo image based on reflected signals received by at least one second sensor while driving the vehicle; fusing the stereo image and the depth information to generate fused information; and detecting at least one object included in the stereo image using the fused information.

Accordingly, the ADAS may fuse information of a stereo image and depth information to generate fused information and may detect at least one object based on the fused information. Therefore, the ADAS may enhance performance of detecting objects.

BRIEF DESCRIPTION OF THE DRAWINGS

Illustrative, non-limiting exemplary embodiments of the inventive concept will be more clearly understood from the following detailed description in conjunction with the accompanying drawings.

FIG. 5 is a block diagram illustrating an example of an object detection module of FIG. 4A according to an exemplary embodiment of the inventive concept.

FIG. 25 is a block diagram illustrating an electronic device according to an exemplary embodiment of the inventive concept.

DETAILED DESCRIPTION OF THE EXEMPLARY EMBODIMENTS

The inventive concept will be described more fully hereinafter with reference to the accompanying drawings, in which some exemplary embodiments thereof are shown.

Figure 1:
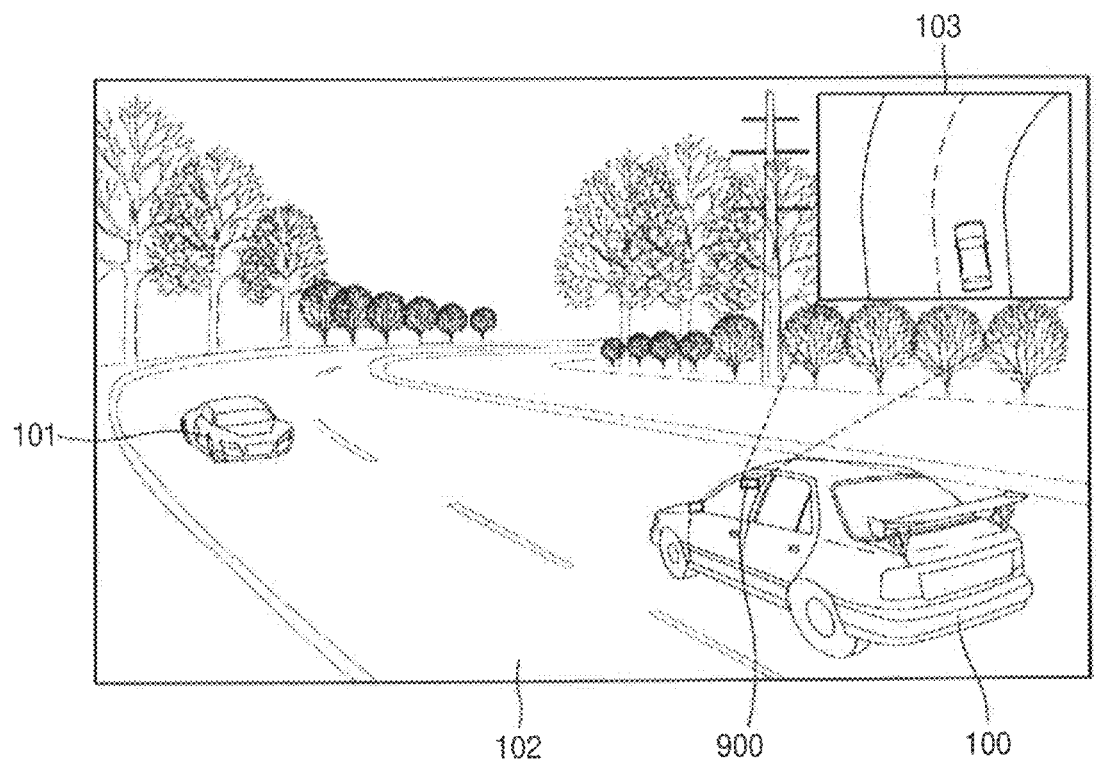
FIG. 1 illustrates an example in which an advanced driver assist system (ADAS) detects an object in front of a vehicle and determines whether an event occurs, according to an exemplary embodiment of the inventive concept.

FIG. 1 illustrates an example in which an advanced driver assist system (ADAS) detects an object in front of a vehicle and determines whether an event occurs, according to an exemplary embodiment of the inventive concept.

Referring to FIG. 1, an ADAS 900 may be a device mounted in a vehicle 100. The ADAS 900 may include various circuitry and components to receive a video sequence including a stereo image from a camera mounted in the vehicle 100 and reflected signals (reflected waves or reflected lights) from other sensors mounted in the vehicle 100 and determine an occurrence of various events based on the video sequence and the reflected signals. The various events may include object detection, object tracking and scene segmentation. The ADAS 900 may provide a notification message to a user based on occurrence of the events.

While it is described that the ADAS 900 receives the video sequence from the camera mounted in the vehicle 100, the ADAS 900 is not limited thereto. The ADAS 900 may receive the video sequence from a camera to capture images of a surrounding environment of the vehicle 100. The surrounding environment of the vehicle 100 may include, for example, a front side, lateral sides, and a rear side. For example, the surrounding environment may include a region in front of the vehicle 100, a region behind the vehicle 100, a region on a left side of the vehicle, a region on a right side of the vehicle 100, a region above the vehicle 100, and a region below the vehicle 100.

According to an exemplary embodiment of the inventive concept, the ADAS 900 is configured to detect an event or a location of an event by tracking a bounding box representing a boundary of an object. The ADAS 900 may differently recognize levels of importance of a type of object based on locations thereof, thereby determining whether an event occurs based on the locations of the object.

According to an exemplary embodiment, the ADAS 900 detects at least one video sequence (or, a stereo image) 103 including an object, from among a plurality of video sequences, and may obtain radar reflected waves or reflected lights (not shown). For example, the ADAS 900 may include a radar emitting a signal that reflects off an object to generate the radar reflected waves. For example, the ADAS 900 may include a laser emitting light that reflects off an object to generate the reflected lights. The ADAS 900 may detect a road 102 including a fixed pattern and another vehicle 101 moving according to time, by analyzing the at least one video sequence 103. According to an exemplary embodiments, the ADAS 900 may determine occurrence of an event based on the other vehicle 101, by analyzing a location or coordinate of the other vehicle 101 in the at least one video sequence 103.

The ADAS 900 may include various circuitry, including, for example, and without limitation, head units or embedded boards in vehicles, or the like, but is not limited thereto. Also, the ADAS 900 may include wearable devices having a communication function and a data processing function, such as, for example, watches, glasses, hair bands, rings, or the like. However, the ADAS 900 is not limited thereto, and may include all types of devices configured to obtain an image (for example, a video and a still image) from a camera and provide a notification message to a user based on the obtained image.

According to an exemplary embodiment, the ADAS 900 may be a module mounted in a vehicle including various circuitry and components. The ADAS 900 may be configured to control an operation of the vehicle and communicate with other modules mounted in the vehicle via a certain network.

According to exemplary embodiments, the vehicle may include any means of transportation, such as, for example, and without limitation, an automobile, a bus, a truck, a train, a bicycle, a motorcycle, or the like, providing a communication function, a data processing function, and/or a transportation function.

Also, the ADAS 900 may communicate with a server (not shown) and another electronic device (not shown) via a certain network, in order to receive a video sequence, reflected waves, or reflected lights, transmit a notification message, and transmit a command for controlling an operation of the other electronic device. In this case, the network may include, for example, and without limitation, a local area network (LAN), a wide area network (WAN), a value-added network (VAN), a mobile radio communication network, a satellite communication network, or the like, and any combinations thereof. The network may be a comprehensive data communication network configured to enable components included in the network to smoothly communicate with one another, and may include a wired Internet, a wireless Internet, and a mobile wireless communication network. The wireless communication may include, for example, and without limitation, wireless LAN (Wi-fi), Bluetooth, Bluetooth low energy, Zigbee, Wi-fi direct (WFD), ultra wideband (UWB), infrared data association (IrDA), near-field communication (NFC), or the like, but is not limited thereto.

Figure 2A:
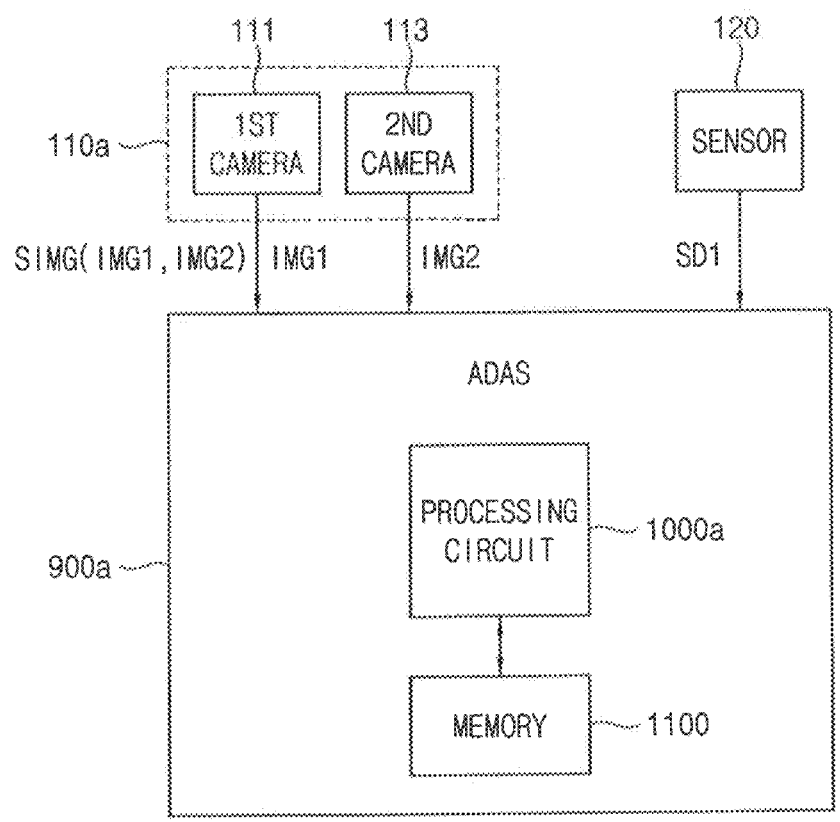
FIG. 2A is a block diagram illustrating an example of an ADAS according to an exemplary embodiment of the inventive concept.

FIG. 2A is a block diagram illustrating an example of an ADAS according to an exemplary embodiment of the inventive concept.

Referring to FIG. 2A, an ADAS 900a includes a processing circuit 1000a and a memory 1100.

In FIG. 2A, a first sensor 110a and a second sensor 120 which are mounted in the vehicle 100 are illustrated together for convenience of explanation. The first sensor 110a may be a stereo camera and may include a first camera 111 and a second camera 113. The second sensor 120 may be a radar to generate distance information or a light detection and arranging (LiDAR) to generate depth information. In FIG. 2A, it is assumed that the second sensor 120 is a radar. The processing circuit 1000a may include at least one processor.

The stereo camera 110a captures a front side of the vehicle 100 and provides the processing circuit 1000a with a video sequence including a plurality of frames. For example, the stereo camera 110a may capture images of regions in front of the vehicle 100. Each of the plurality of frames may correspond to a stereo image SIMG including a first viewpoint image IMG1 and a second viewpoint image IMG2. The radar 120 may emit electromagnetic waves of a certain radio frequency or range of radio frequencies, receive radar reflected waves reflected from the object in response to the emitted waves and provide the received radar reflected waves to the processing circuit 1000a as first sensing data SD1.

The memory 1100 stores instructions executable by the processing circuit 1000a and the processing circuit 1000a executes the instructions to cause the ADAS 900a to obtain, from the vehicle 100, a stereo image SIMG including the first viewpoint image IMG1 and the second viewpoint image IMG2 captured while driving the vehicle 100, and the first sensing data SD1, to generate depth information on at least one object in the stereo image SIMG, to fuse the stereo image SIMG and the depth information to detect the at least one object in the stereo image SIMG and to mark the detected at least one object with a bounding box.

Figure 2B:
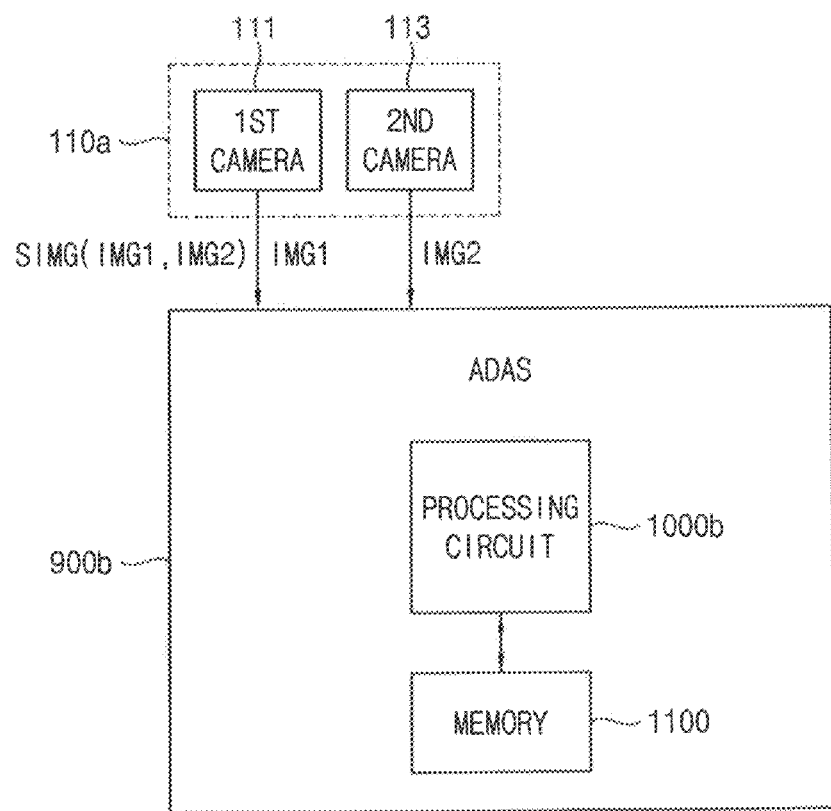
FIG. 2B is a block diagram illustrating another example of an ADAS according to an exemplary embodiment of the inventive concept.

FIG. 2B is a block diagram illustrating another example of an ADAS according to an exemplary embodiment of the inventive concept.

Referring to FIG. 2B, an ADAS 900b includes a processing circuit 1000b and a memory 1100.

In FIG. 2B, a first sensor 110a mounted in the vehicle 100 is illustrated for convenience of explanation. The first sensor 110a may be a stereo camera and may include a first camera 111 and a second camera 113.

The memory 1100 stores instructions executable by the processing circuit 1000b and the processing circuit 1000b executes the instructions to cause the ADAS 900b to obtain, from the vehicle 100, a stereo image SIMG captured while driving the vehicle 100, to generate depth information on at least one object in the stereo image SIMG, to detect the at least one object in the stereo image SIMG based on the depth information and to mark the detected at least one object with a bounding box.

Figure 2C:
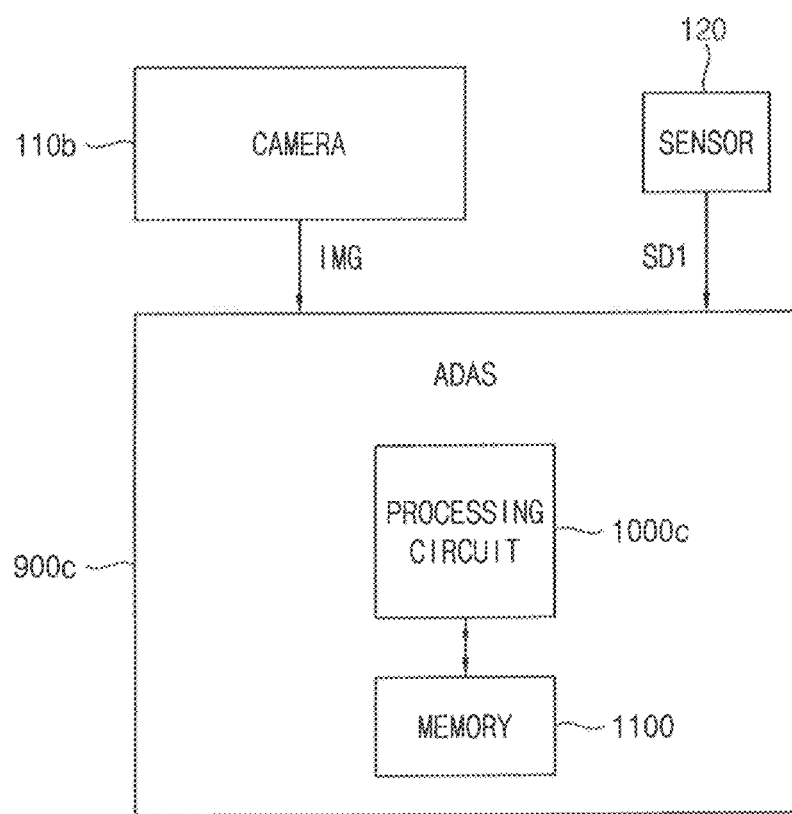
FIG. 2C is a block diagram illustrating an example of an ADAS according to an exemplary embodiment of the inventive concept.

FIG. 2C is a block diagram illustrating an example of an ADAS according to an exemplary embodiment of the inventive concept.

Referring to FIG. 2C, an ADAS 900c includes a processing circuit 1000c and a memory 1100.

In FIG. 2C, a first sensor 110b and a second sensor 120 mounted in the vehicle 100 are illustrated together for convenience of explanation. The first sensor 110b may be a mono camera. The second sensor 120 may be a radar to generate distance information or a light detection and arranging (LiDAR) to generate depth information. In FIG. 2C, it is assumed that the second sensor 120 is a radar.

The first sensor (i.e., the mono camera) 110b captures a front side of the vehicle 100 and provides the processing circuit 1000c with a video sequence including a plurality of frames. For example, the first sensor 110b may capture images of regions in front of the vehicle 100. Each of the plurality of frames may correspond to an image IMG. The second sensor (i.e., the radar) 120 emits electromagnetic waves at a certain radio frequency or range of radio frequencies, receives radar reflected waves reflected from the object in response to the emitted waves and provides the received radar reflected waves to the processing circuit 1000c as first sensing data SD1.

The memory 1100 stores instructions executable by the processing circuit 1000c and the processing circuit 1000c executes the instructions to cause the ADAS 900c to obtain, from the vehicle 100, the image IMG captured while driving the vehicle 100, and the first sensing data SD1, to generate depth information on at least one object in the image IMG, to fuse the image IMG and the depth information to detect the at least one object in the stereo image IMG and to mark the detected at least one object with a bounding box.

Figure 3A:
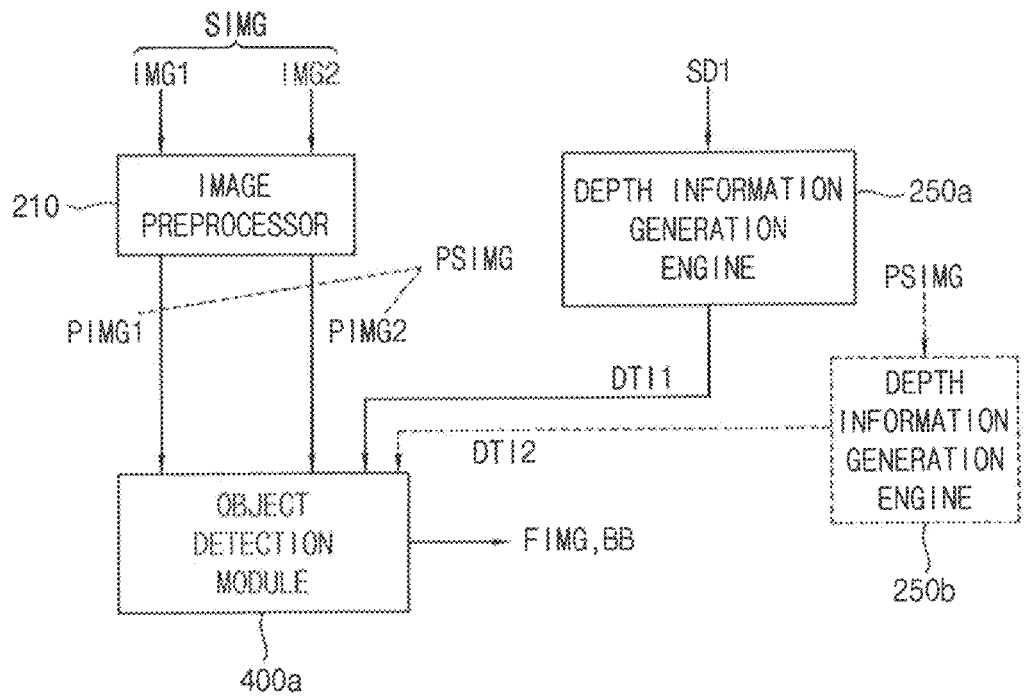
FIG. 3A is a block diagram illustrating an example of the processing circuit in FIG. 2A according to an exemplary embodiment of the inventive concept.

FIG. 3A is a block diagram illustrating an example of the processing circuit in FIG. 2A according to an exemplary embodiment of the inventive concept.

Referring to FIG. 3A, the processing circuit 1000a includes an image pre-processor 210, a depth information generation engine 250a, and an object detection module 400a.

The image pre-processor 210 may pre-process the stereo image SIMG to output a pre-processed stereo image PSIMG including a first pre-processed viewpoint image PIMG1 and a second pre-processed viewpoint image PIMG2. For example, the image pre-processor 210 could pre-process the stereo image SIMG by performing a noise reduction operation on the stereo image SIMG. For, example, the noise reduction operation could remove points from the stereo image SIMG attributed to noise. The depth information engine 250a may generate depth information DTI1 on the at least one object based on the first sensing data (reflected signals) SD1. For example, the depth information DTI1 could include data such as distances, angles (e.g., directions), speeds (e.g., moving speeds), and the strength of the data.

The object detection module 400a fuses the pre-processed stereo image PSIMG and the depth information DTI1 to generate fused information, and detects the at least one object based on the fused information and may output a final image FIMG including the detected at least one object or to provide a bounding box BB indicating the detected at least one object. For example, an equation can be used to apply weights to information within the pre-processed stereo image PSIMG and the depth information DTI1 to predict the bounds and location of a given object. For example, points of the stereo image PSIMG having an intensity above a certain intensity threshold at a location derived from the data of a strength above a certain strength threshold could be interpreted as being part of a detected object.

According to an exemplary embodiment of the inventive concept, the processing circuit 1000a may further a depth information engine 250b that generates depth information DTI2 on the pre-processed stereo image PSIMG. In this case, the object detection module 400a may further fuse the depth information DTI2, may detect the at least one object based on the further fusion and may output the final image FIMG including the detected at least one object or to provide the bounding box BB indicating the detected at least one object. For example, the object detection module 400a may generate fused information from the stereo image PSIMG, the first depth information DTI1 and the second depth information DTI2 and detect the object from the fused information. For example, the depth information generation engine 250b can calculate a depth of a same point in images PIMG1 and PIMG2 and repeat this calculation on each point of the pre-processed stereo image PSIMG.

Figure 3B:
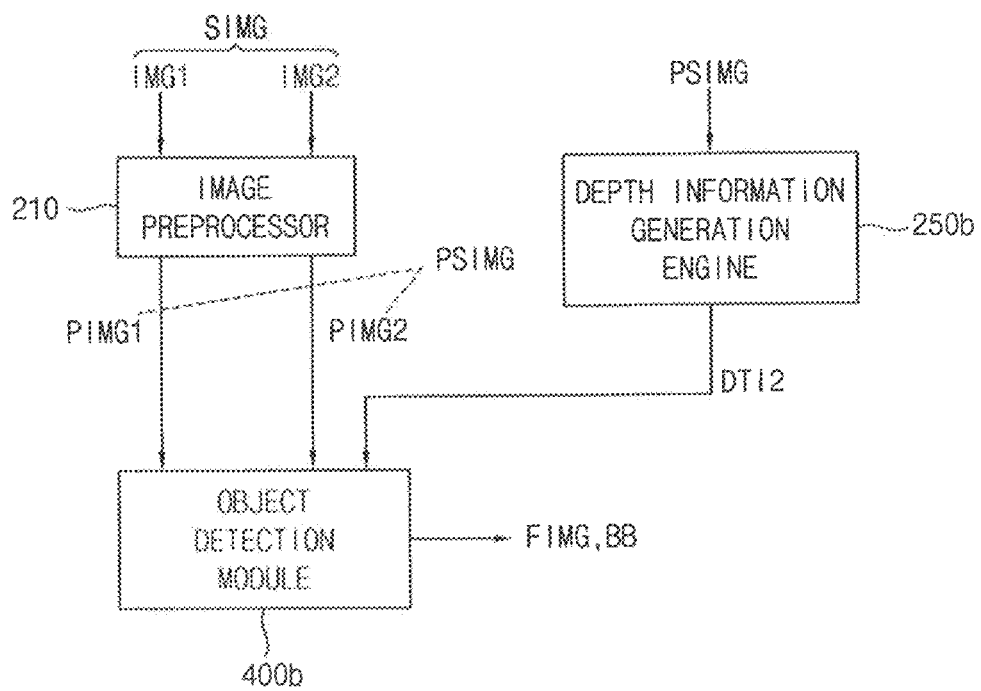
FIG. 3B is a block diagram illustrating an example of the processing circuit in FIG. 2B according to an exemplary embodiment of the inventive concept.

FIG. 3B is a block diagram illustrating an example of the processing circuit in FIG. 2B according to an exemplary embodiment of the inventive concept.

Referring to FIG. 3B, the processing circuit 1000b includes an image pre-processor 210, a depth information generation engine 250b, and an object detection module 400b.

The image pre-processor 210 may pre-process the stereo image SIMG to output a pre-processed stereo image PSIMG including a first pre-processed viewpoint image PIMG1 and a second pre-processed viewpoint image PIMG2. The depth information engine 250b may generate depth information DTI2 based on the pre-processed stereo image PSIMG.

The object detection module 400b may fuse the pre-processed stereo image PSIMG and the depth information DTI2 to generated fused information, detect at least one object based on the fused information and may output a final image FIMG including the detected at least one object or to provide a bounding box BB indicating the detected at least one object.

Figure 3C:
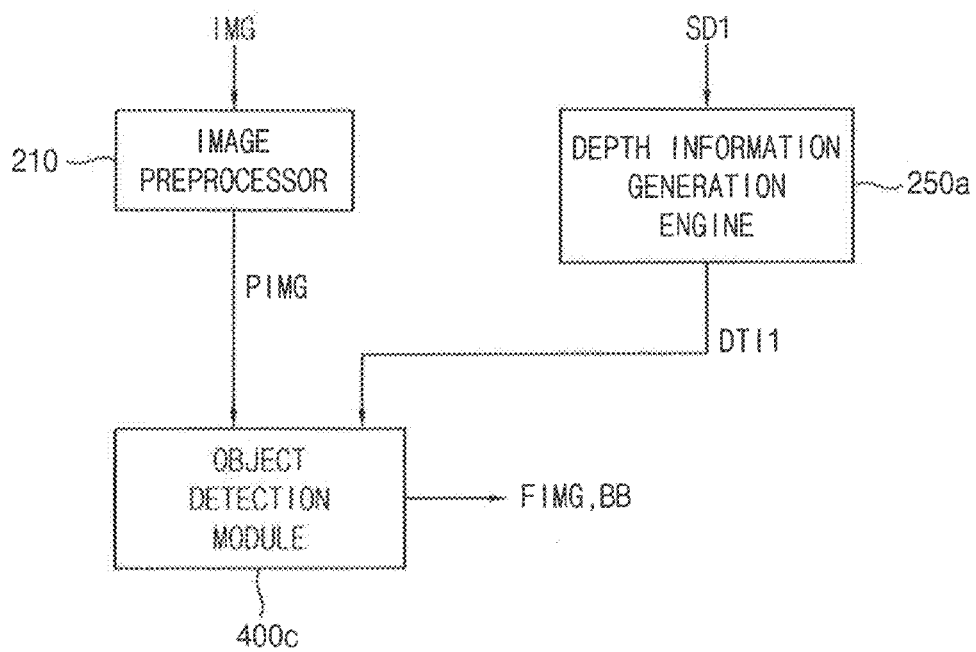
FIG. 3C is a block diagram illustrating an example of the processing circuit in FIG. 2C according to an exemplary embodiment of the inventive concept.

FIG. 3C is a block diagram illustrating an example of the processing circuit in FIG. 2C according to an exemplary embodiment of the inventive concept.

Referring to FIG. 3C, the processing circuit 1000c includes an image pre-processor 210, a depth information generation engine 250a, and an object detection module 400c.

The image pre-processor 210 may pre-process the image IMG to output a pre-processed image PIMG. The depth information engine 250a may generate depth information DTI1 on at least one object based on the first sensing data (reflected signals) SD1.

The object detection module 400c may fuse the pre-processed image PIMG and the depth information DTI1 to generated fused information, detect at least one object based on the fused information and may output a final image FIMG including the detected at least one object or to provide a bounding box BB indicating the detected at least one object.

Figure 4A:
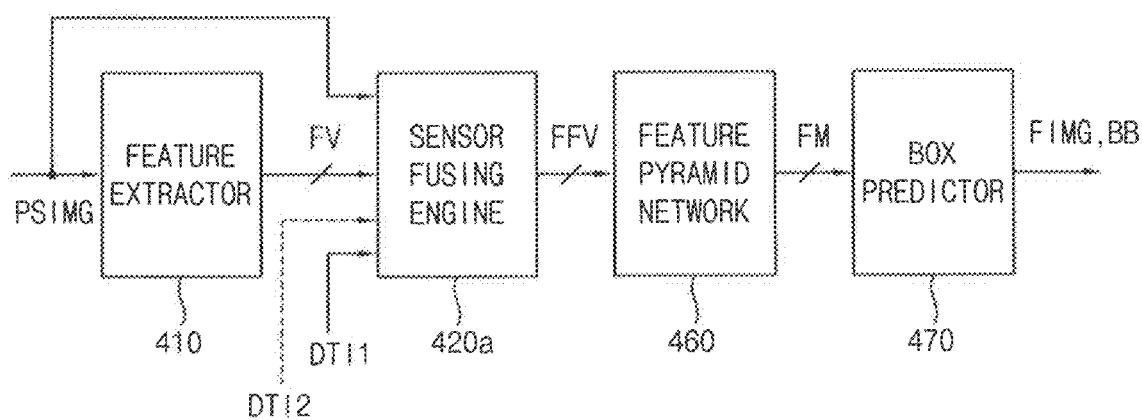
FIG. 4A is a block diagram illustrating an example of an object detection module in FIG. 3A according to an exemplary embodiment of the inventive concept.

FIG. 4A is a block diagram illustrating an example of the object detection module in FIG. 3A according to an exemplary embodiment of the inventive concept.

Referring to FIG. 4A, the object detection module 400a includes a feature extractor 410, a sensor fusing engine 420a, a feature pyramid network 460 and a box predictor 470.

The feature extractor 410 may extract features of at least one object from the pre-processed stereo image PSIMG to output feature vectors FV. The sensor fusing engine 420a may adjust a resolution of the depth information DTI1 based on the pre-processed stereo image PSIMG to generate a depth image and fuse a depth image and the feature vectors FV to generate fused feature vectors FFV. According to an exemplary embodiment, the sensor fusing engine 420a generates the depth image further based on the depth information DTI2 and fuse the depth image and the feature vectors FV to generate the fused feature vectors FFV.

The feature pyramid network 460 may generate feature maps FM based on the fused feature vectors FFV. The box predictor 470 may detect the at least one object based on the feature maps FM to provide the final image FIMG including the detected at least one object or to provide the bounding box BB indicating the detected at least one object. The depth information DTI1 or DTI2 may be referred to as depth data.

Figure 4B:
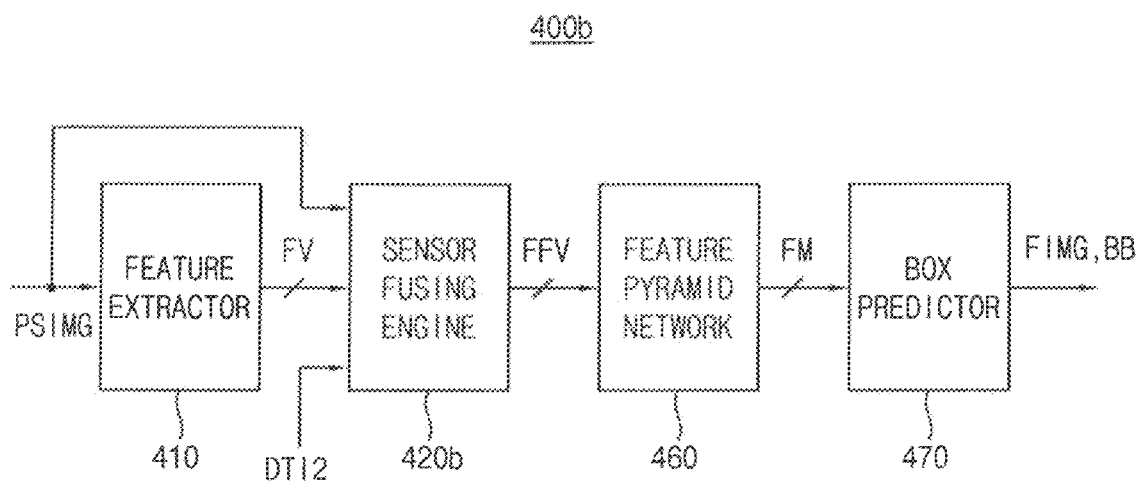
FIG. 4B is a block diagram illustrating an example of an object detection module in FIG. 3B according to an exemplary embodiment of the inventive concept.

FIG. 4B is a block diagram illustrating an example of the object detection module in FIG. 3B according to an exemplary embodiment of the inventive concept.

Referring to FIG. 4B, the object detection module 400b may include a feature extractor 410, a sensor fusing engine 420b, a feature pyramid network 460 and a box predictor 470.

The feature extractor 410 may extract features of at least one object from the pre-processed stereo image PSIMG to output feature vectors FV. The sensor fusing engine 420b may adjust a resolution of the depth information DTI2 based on the pre-processed stereo image PSIMG to generate a depth image and fuse the depth image and the feature vectors FV to generate fused feature vectors FFV.

Figure 4C:
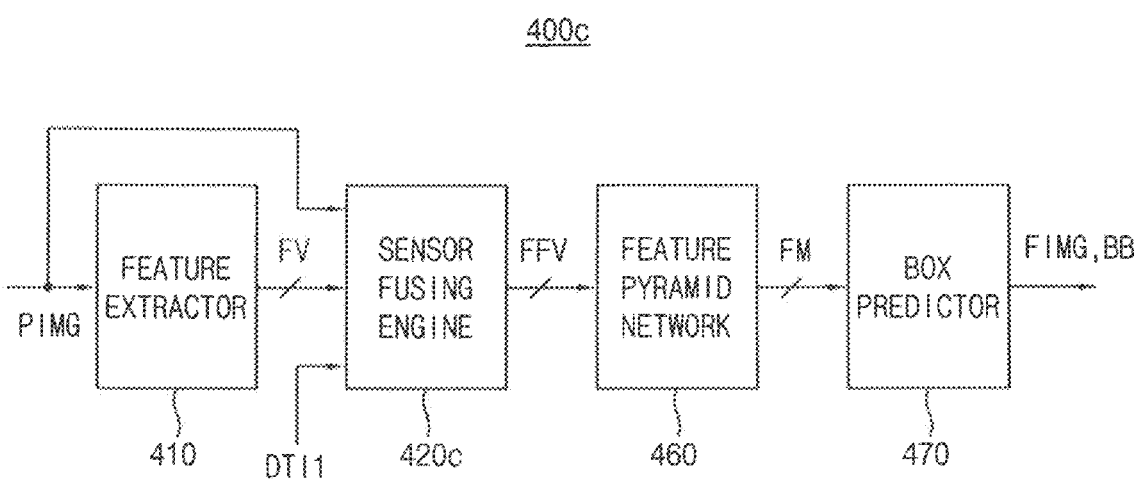
FIG. 4C is a block diagram illustrating an example of an object detection module in FIG. 3C according to an exemplary embodiment of the inventive concept.

FIG. 4C is a block diagram illustrating an example of the object detection module in FIG. 3C according to an exemplary embodiment of the inventive concept.

Referring to FIG. 4C, the object detection module 400c includes a feature extractor 410, a sensor fusing engine 420c, a feature pyramid network 460 and a box predictor 470.

The feature extractor 410 may extract features of the at least one object from the pre-processed image SIMG to output feature vectors FV. The sensor fusing engine 420c may adjust a resolution of the depth information DTI1 based on the pre-processed image PIMG to generate a depth image and fuse the depth image and the feature vectors FV to generate fused feature vectors FFV.

FIG. 5 is a block diagram illustrating an example of the object detection module of FIG. 4A according to an exemplary embodiment of the inventive concept.

Referring to FIG. 5, the object detection module 400a includes the feature extractor 410, the sensor fusing engine 420a, the feature pyramid network 460 and the box predictor 470.

In FIG. 5, the pre-processed stereo image PSIMG has a first resolution and the depth information DTI1 has a second resolution smaller than the first resolution.

The feature extractor 410 includes a feature extraction module (FEM) 411 and a plurality of layers LA1, LA2 and LA3 and may extract features of the at least one object from the pre-processed stereo image PSIMG by the using the FEM 411 and the layers LA1, LA2 and LA3 to provide feature vectors FV1, FV2 and FV3.

The sensor fusing engine 420a includes a resizing engine 430a and may adjust a size of the depth information DTI1 having a second resolution with respect to a size and a resolution of the pre-processed stereo image PSIMG. The resizing engine 430a may adjust a resolution of the depth information DTI1, may resize a size of the depth information DTI1 to generate a resized depth image RDTIMG11, and may fuse the feature vectors FV1, FV2 and FV3 and the resized depth image RDTIMG11 by using convolution layers 421, 422 and 423 to generate fused feature vectors FFV11, FFV12 and FFV13.

The sensor fusing engine 420a may further include a first down sampler and second down sampler, the first down sampler may perform down-sampling on the resized depth image RDTIMG11 at least once to generate resized depth image RDTIMG12, the second down sampler may perform down-sampling on the resized depth image RDTIMG11 at least once to generate resized depth image RDTIMG13, and may fuse the feature vectors FV1, FV2 and FV3 and the resized depth images RDTIMG11, RDTIMG12 and RDTIMG13 by using the convolution layers 421, 422 and 423 to generate the fused feature vectors FFV11, FFV12 and FFV13.

The feature pyramid network 460 may generate feature maps FM11, FM12 and FM13 based on the fused feature vectors FFV11, FFV12 and FFV13 and the box predictor 470 may provide the final image FIMG or the bounding box BB based on the feature maps FM11, FM12 and FM13.

According to an exemplary embodiment of the inventive concept, the box predictor 470 marks at least one object detected in the feature maps FM11, FM12 and FM13 by using at least one of a single shot detector (SSD) and a faster recurrent convolution neural network (R-CNN). The faster R-CNN may include at least one of a region proposal network (RPN) and a region of interest (RoI) set.

When the box predictor 470 uses the faster R-CNN, the box predictor 470 may select a feature map which includes coordinates of a regional class of an image of the feature maps FM11, FM12 and FM13, may identify coordinates to distinguish the region in the selected feature map, and may extract the identified coordinates as an estimated region in which an object may be included. The box predictor 470 may mark an object with a bounding box to encircle an outer boundary of the object with respect to the extracted coordinates. When the faster R-CNN uses the PRN, the box predictor 470 may obtain candidate regions with a high probability that an object of interest exists from the feature maps FM11, FM12 and FM13, may determine whether each of the candidate regions includes the object, and may mark the object with a bounding box to encircle an outer boundary of the object with respect to a candidate region that includes the object.

When the box predictor 470 uses the SSD, the box predictor 470 may extract regions in which an object may be included by using features of all layers of the feature maps FM11, FM12 and FM13 and mark an object with a bounding box to encircle an outer boundary of the object with respect to each of the extracted regions.

Figure 6A:
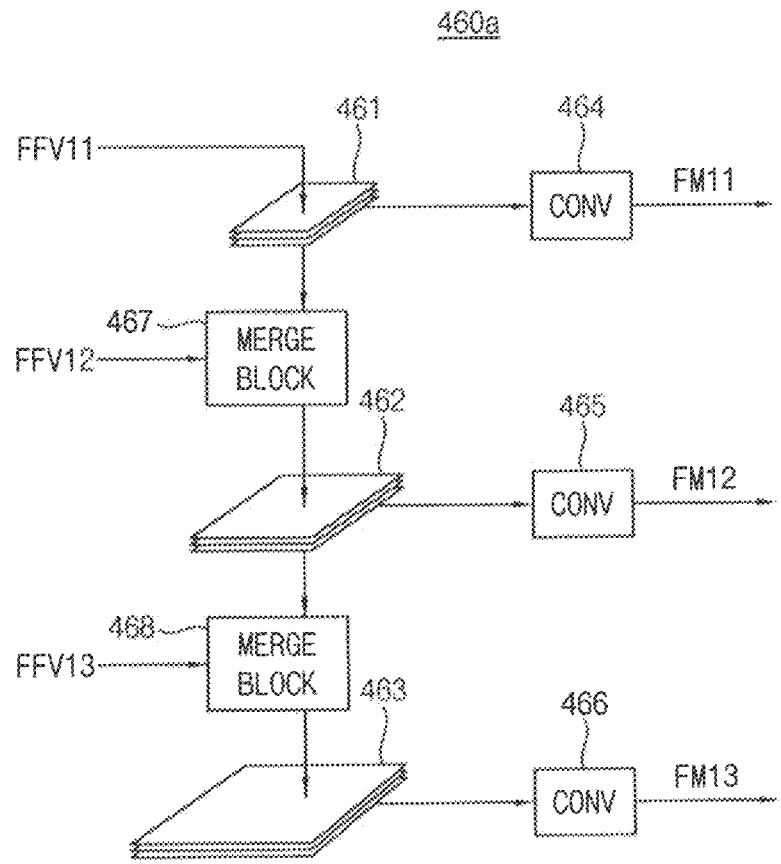
FIG. 6A illustrates an example of a feature pyramid network in FIG. 5 according to an exemplary embodiment of the inventive concept.

FIG. 6A illustrates an example of the feature pyramid network in FIG. 5 according to an exemplary embodiment of the inventive concept.

Referring to FIG. 6A, the feature pyramid network 460a may generate high-resolution feature maps FM11, FM12 and FM13 based on the fused feature vectors FFV11, FFV12 and FFV13.

The feature pyramid network 460a may include a plurality of layers 461, 462 and 462, a plurality of merge blocks 467 and 468 and a plurality of convolution kernels 464, 465, 466. The number of the layers and the convolution kernels are not limited thereto.

The layer 461 up-samples the fused feature vector FFV1 and the convolution kernel 464 applies a convolution conversion to an output of the layer 461 to output the feature map FM11. The merge block 467 merges the output of the layer 461 and the fused feature vector FFV2 to generate a first merged output and provides the first merged output.

The layer 462 up-samples the output of the merge block 467 and the convolution kernel 465 applies a convolution conversion to an output of the layer 462 to output the feature map FM12.

The merge block 468 merges the output of the layer 462 and the fused feature vector FFV3 to generate a second merged output and provides the second merged output. The layer 463 up-samples the output of the merge block 468 and the convolution kernel 466 applies a convolution kernel to an output of the layer 463 to output the feature map FM13.

Figure 6B:
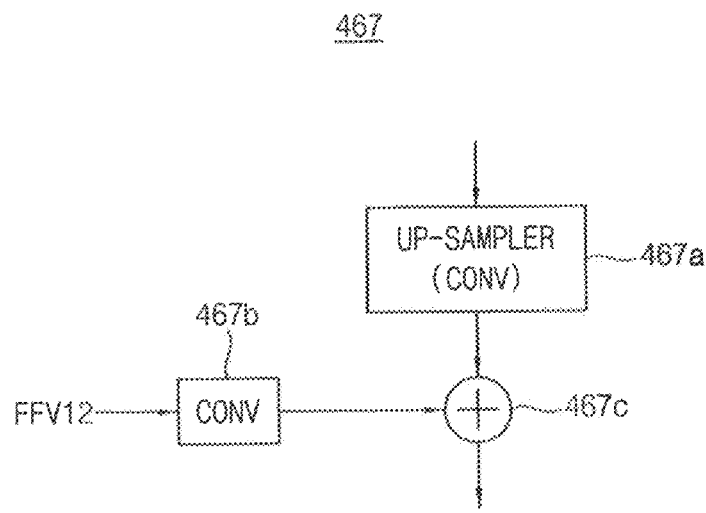
FIG. 6B illustrates an example of a merge block in the feature pyramid network of FIG. 6A.

FIG. 6B illustrates an example of the merge block in the feature pyramid network of FIG. 6A according to an exemplary embodiment of the inventive concept.

Referring to FIG. 6B, the merge block 467 may include an up-sampler 467a, a convolutional layer (kernel) 467b and a summer 467c.

The up-sampler 467a up-samples the output of the layer 461 and provides an up-sampled output to the summer 467c. The up-sampler 467a may include a convolution layer CONV. The convolution layer CONV 467b applies to a convolution conversion to the fused feature vector FFV12 to provide converted output to the summer 467c. The summer 467c sums the output of the up-sampler 467a and the output of the convolution layer 467b to generate a summed result and provides the summed result to the layer 462.

Figure 7A:
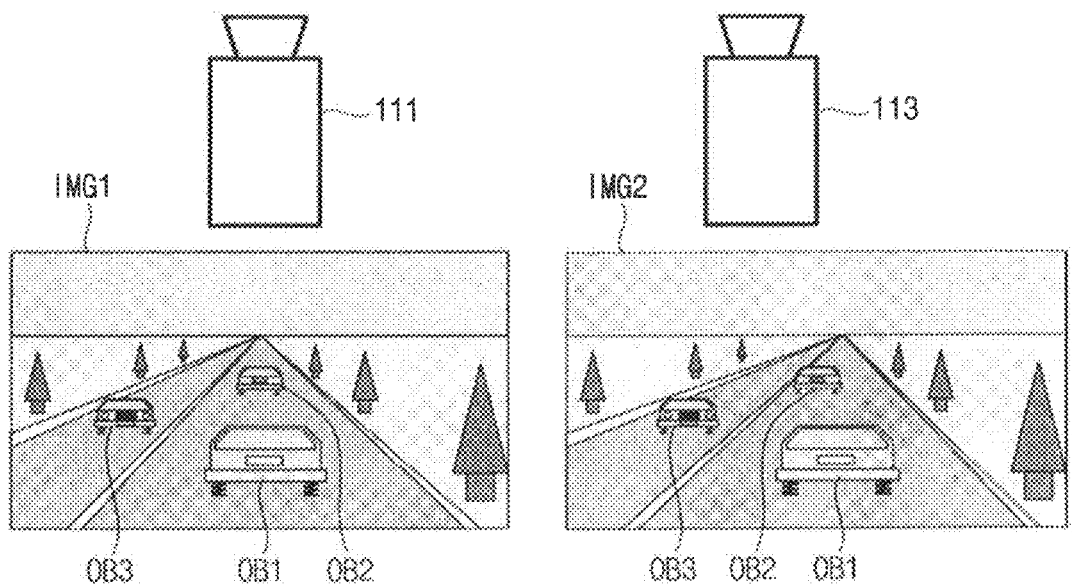
FIGS. 7A and 7B illustrate objects in a first view point image and a second view point image according to positions of a first camera and a second camera in FIG. 2A, respectively.
Figure 7B:
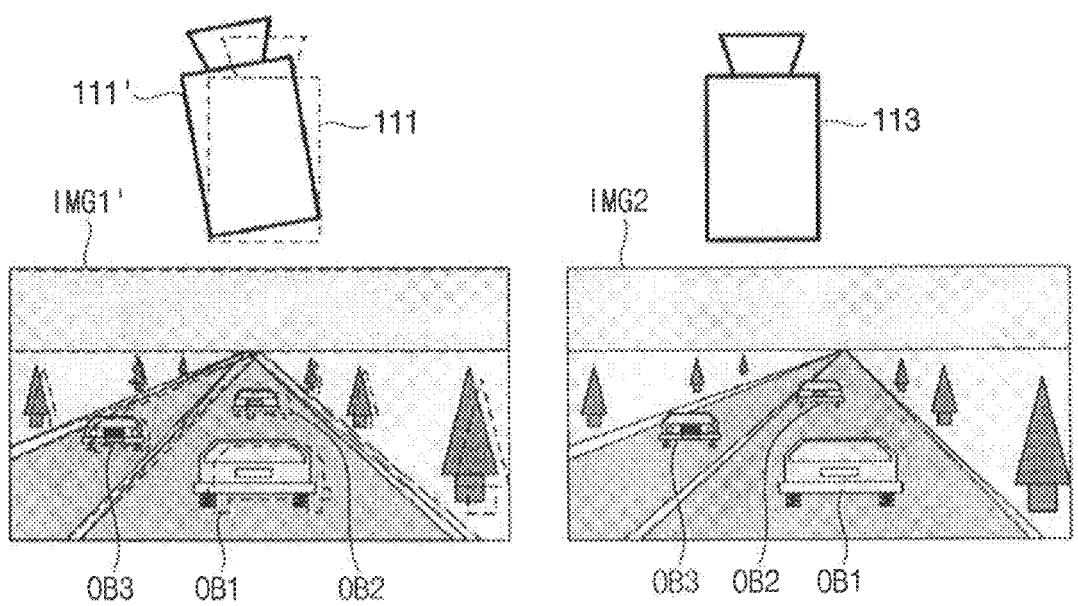

FIGS. 7A and 7B illustrate objects in the first view point image and the second view point image according to positions of the first camera and the second camera in FIG. 2A, respectively.

FIG. 7A illustrates the first view point image IMG1 and the second view point image IMG2 when the first camera 111 and the second camera 113 are positioned at their original positions. When calibration information on the first camera 111 and the second camera 113 is obtained, depth information on objects OB1, OB2 and OB3 may be accurately obtained by using disparity information between the first view point image IMG1 and the second view point image IMG2.

FIG. 7B illustrates that a physical position of the first camera 111 is changed from its original position. When the physical position of the first camera 111 is changed to a position 111', the first view point image IMG1 is changed to a first view point image IMG1' and positions of objects OB1, OB2 and OB2 in the first view point image IMG1' are also changed. Therefore, disparity information between the first view point image IMG1' and the second view point image IMG2 generated by the processing circuit 1000a is changed and an accuracy of depth information on the objects OB1, OB2 and OB3 based on the disparity information is decreased. Dotted lines in the first view point image IMG1' denote the objects OB1, OB2 and OB3 before the physical position of the first camera 111 is changed and solid lines in the first view point image IMG1' denote the objects OB1, OB2 and OB3 after the physical position of the first camera 111 is changed.

Figure 8:
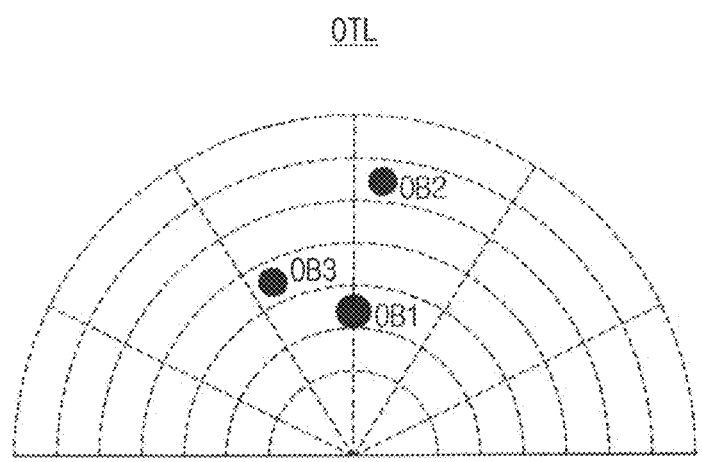
FIG. 8 illustrates an exemplary object tracking list which may be generated based on first sensing data obtained by a second sensor in FIG. 2A.

FIG. 8 illustrates an object tracking list which may be generated based on first sensing data obtained by the second sensor in FIG. 2A.

Referring to FIG. 8, an object tracking list OTL may represent a distance and velocity (e.g., moving speed) of each of the objects OB1, OB2 and OB3 from the second sensor, i.e., the radar 120 based on the first sensing data SD1 obtained by the radar 120. That is, the object tracking list OTL may represent depth information on each of the objects OB1, OB2 and OB3. The object tracking list OTL may also represent an angle or direction of the objects OB1, OB2, and OB3 with respect to the vehicle.

Figure 9:
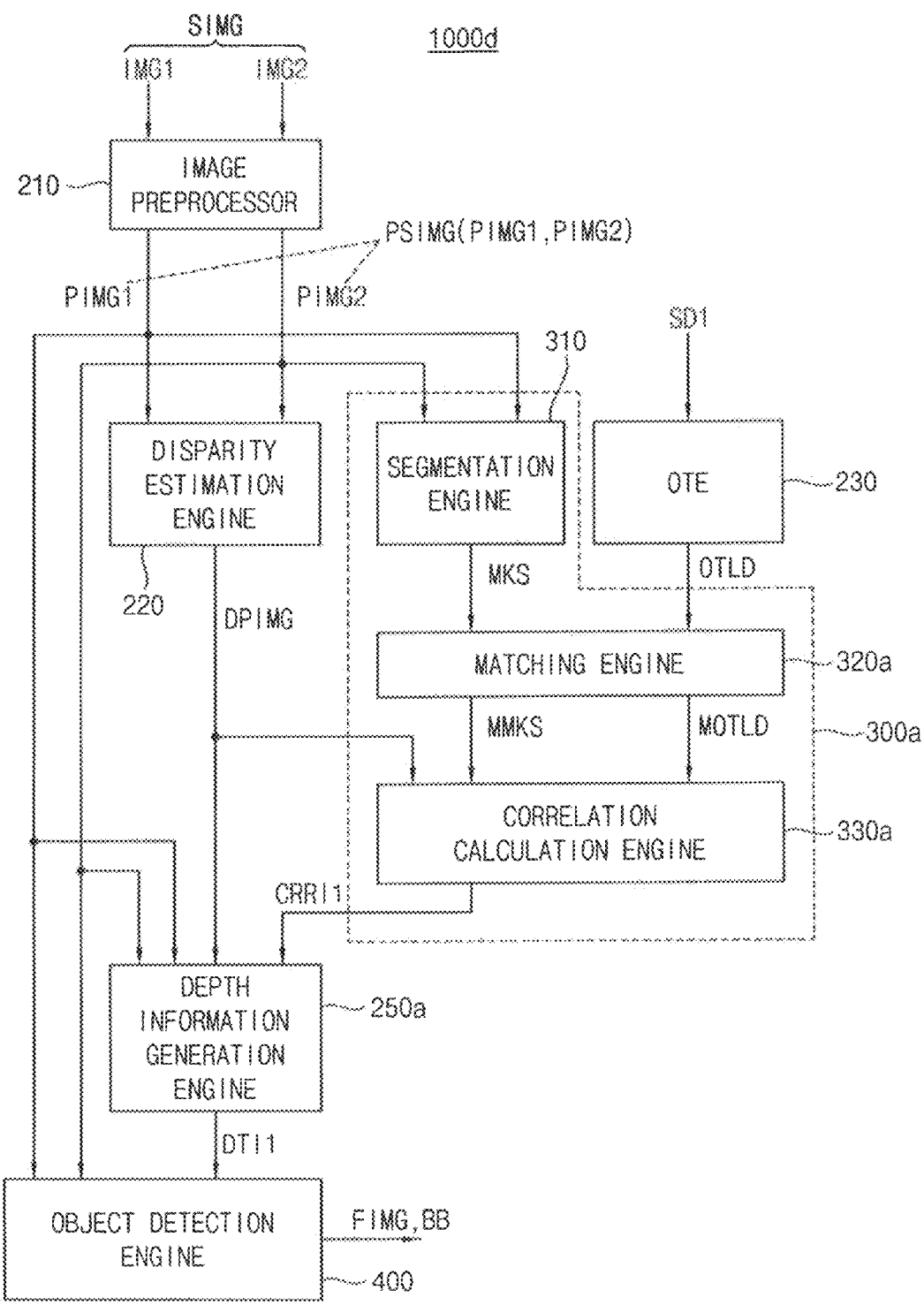
FIG. 9 is a block diagram illustrating an example of the processing circuit in the ADAS in FIG. 2A according to an exemplary embodiment of the inventive concept.

FIG. 9 is a block diagram illustrating an example of the processing circuit in the ADAS in FIG. 2A according to an exemplary embodiment of the inventive concept.

Referring to FIG. 9, the processing circuit 1000d includes an image pre-processor 210, a disparity estimation engine 220, an object tracking engine 230, a correlation calculation module 300a, a depth image generation engine 250a, and an object detection module 400.

The image pre-processor 210 may pre-process the stereo image SIMG to output a pre-processed stereo image PSIMG including a first pre-processed viewpoint image PIMG1 and a second pre-processed viewpoint image PIMG2. The image pre-processor 210 may perform noise reduction, rectification, calibration, color enhancement, color space conversion, interpolation, and camera gain control on the stereo image SIMG. The image pre-processor 210 may output the pre-processed stereo image PSIMG, which maybe more clear than the stereo image SIMG.

According to an exemplary embodiment, the processing circuit 1000d does not include the image pre-processor 210 and in this case, the stereo image SIMG including at least one of the first view point image IMG1 and the second view point image IMG2 is provided to the disparity estimation engine 220 and the correlation calculation module 300a.

The disparity estimation engine 220 may generate a disparity image DPIMG including the disparity information based on the first pre-processed viewpoint image PIMG1 and the second pre-processed viewpoint image PIMG2. The disparity estimation engine 220 may output the disparity image DPIMG including the disparity information by performing stereo matching on the first pre-processed viewpoint image PIMG1 and the second pre-processed viewpoint image PIMG2. The disparity estimation engine 220 may output the disparity image DPIMG based on a difference between pixel values of corresponding pixels of the first pre-processed viewpoint image PIMG1 and the second pre-processed viewpoint image PIMG2.

The object tracking engine 230 may provide object tracking list data OTLD including distance information with respect to the at least one object based on the first sensing data corresponding to reflected waves from at least one object.

The correlation calculation module 300a may calculate correlation information CRRI1 based on pre-processed stereo image PSIMG, the object tracking list data OTLD and the disparity image DPIMG including the disparity information and may provide the correlation information CRRI1 to the depth image generation engine 250a.

The correlation calculation module 300a may include a scene segmentation engine 310, a matching engine 320a and a correlation calculation engine 330a.

In an exemplary embodiment, the scene segmentation engine 310 segments at least one of the first pre-processed viewpoint image PIMG1 and the second pre-processed viewpoint image PIMG2 to extract at least one mask MKS. The matching engine 320a may perform a matching operation on the at least one mask MKS and the object tracking list data OLTD to output matching results MMKS and MOLTD to the correlation calculation engine 330a. The matching results MMKS and MOLTD may include a first matching result MMKS on the mask MKS and a second matching result MOTLD on the object tracking list data OLTD.

The correlation calculation engine 330a may receive the matching results MMKS and MOLTD and the disparity image DPIMG including the disparity information, may calculate the correlation information CRRI1 between the depth information and the disparity information based on the matching results MMKS and MOLTD and the disparity information and may provide the correlation information CRRI1 to the depth image generation engine 250a.

The depth image generation engine 250a may correct depth values of the pre-processed stereo image PSIMG based on the disparity information and the correlation information CRRI1 to generate depth information DTI1 with respect to the pre-processed stereo image PSIMG and may provide the depth information DTI1 to the object detection module 400.

For example, the depth image generation engine 250a may correct depth values of the pre-processed stereo image PSIMG based on the following equation 1.

$$Z=(B \times f \times s)/d \quad \text{[Equation 1]}$$

In equation 1, Z denotes a depth value, B denotes a baseline, which is a distance between the first camera 111 and the second camera 112, f denotes a camera focal length of the first camera 111 and the second camera 112, d denotes a disparity, and s corresponds to the correlation information CRRI1.

The object detection engine 400 may detect at least one object in the pre-processed stereo image PSIMG to output a final image FIMG including the detected at least one object or to output a bounding box BB indicating the detected at least one object in the final image FIMG.

The processing circuit 1000d may display the final image FIMG including the detected at least one object or the bounding box BB marking the detected at least one object on a display or a head-up display (HUD) of the driving vehicle.

Figure 10:
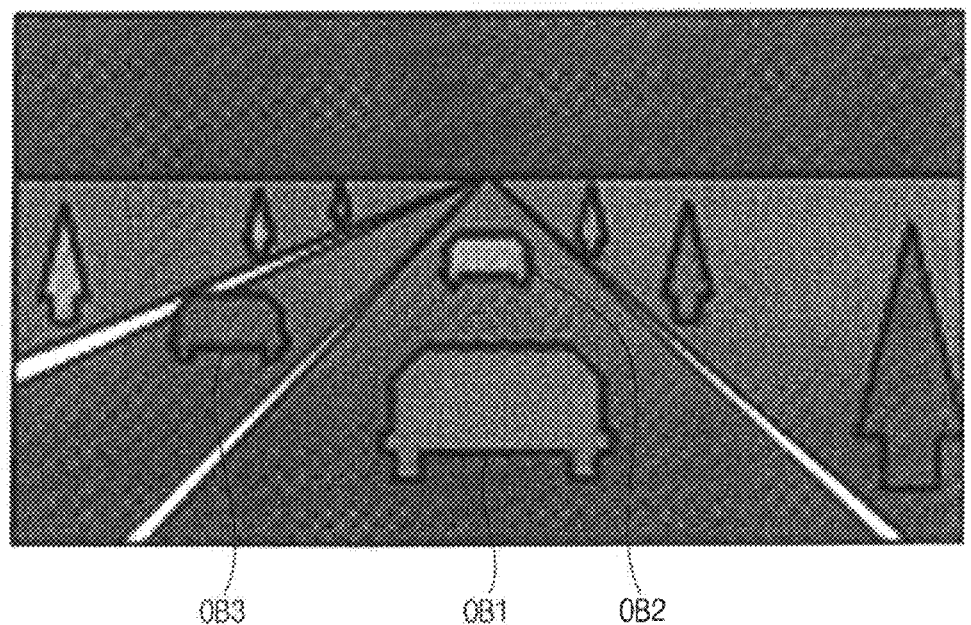
FIG. 10 illustrates an example of a disparity image in the processing circuit in FIG. 9.

FIG. 10 illustrates an example of the disparity image in the processing circuit in FIG. 9.

Referring to FIGS. 9 and 10, the disparity estimation engine 220 may output the disparity image DPIMG based on a difference between pixel values of corresponding pixels of the first pre-processed viewpoint image PIMG1 and the second pre-processed viewpoint image PIMG2.

Figure 11:
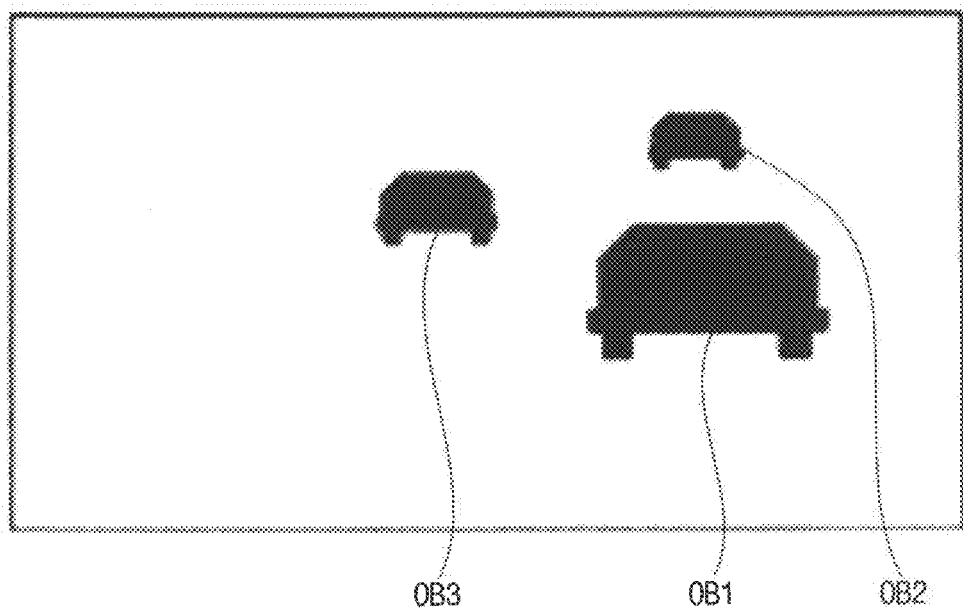
FIG. 11 illustrates an example of a mask in the processing circuit in FIG. 9.

FIG. 11 illustrates an example of the mask in the processing circuit in FIG. 9.

Referring to FIGS. 9 and 11, the scene segmentation engine 310 may segment at least one of the first pre-processed viewpoint image PIMG1 and the second pre-processed viewpoint image PIMG2 to extract masks MKS.

The masks MSK may be represented as the same color with respect to a distance from the baseline.

Figure 12:
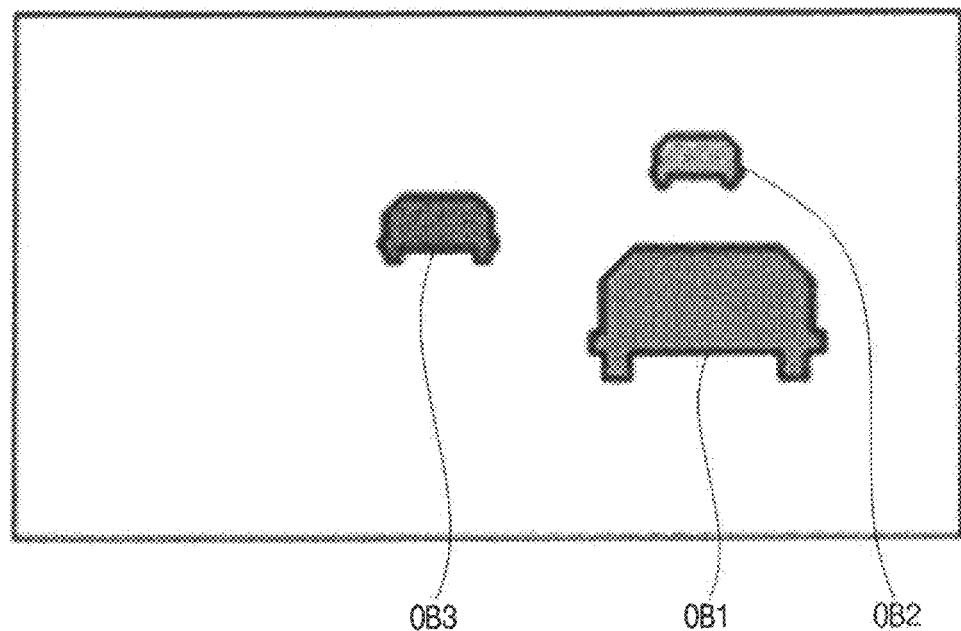
FIG. 12 illustrates an example that in which a correlation calculation engine in the processing circuit in FIG. 9 combines the disparity image and the mask.

FIG. 12 illustrates an example in which the correlation calculation engine in the processing circuit in FIG. 9 combines the disparity image and the mask.

Referring to FIGS. 9 and 12, the correlation calculation engine 330a may combine the disparity image DPIMG and the masks MSK to represent masks MSK with different identifiers according to a distance of the objects OB1, OB2 and OB3 from the baseline.

Figure 13:
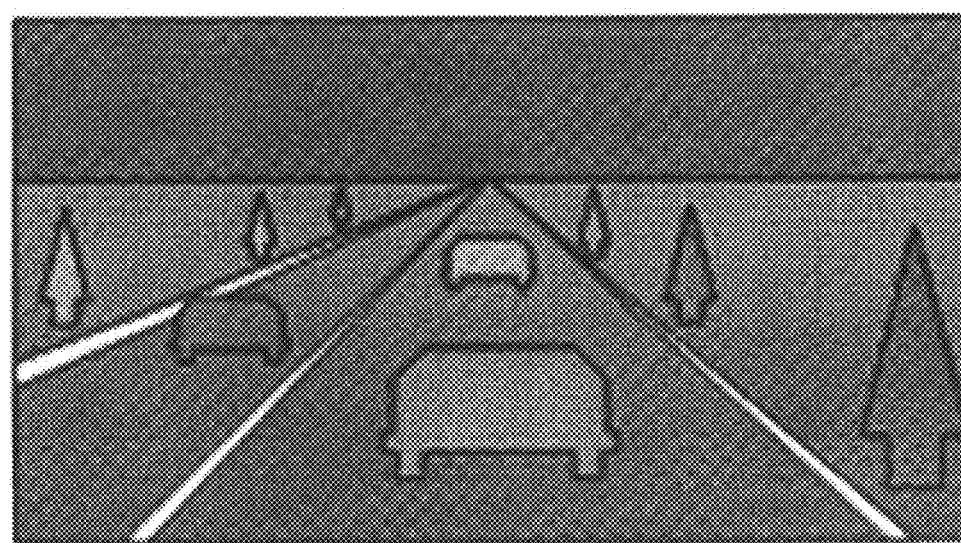
FIG. 13 illustrates an example of depth information in the processing circuit in FIG. 9.

FIG. 13 illustrates an example of the depth information in the processing circuit in FIG. 9.

Referring to FIS. 9 and 13, the depth image generation engine 250a may correct depth values of the pre-processed stereo image PSIMG based on the disparity information and the correlation information CRRI1 to generate the depth information DTI1 with respect to the pre-processed stereo image PSIMG.

Figure 14:
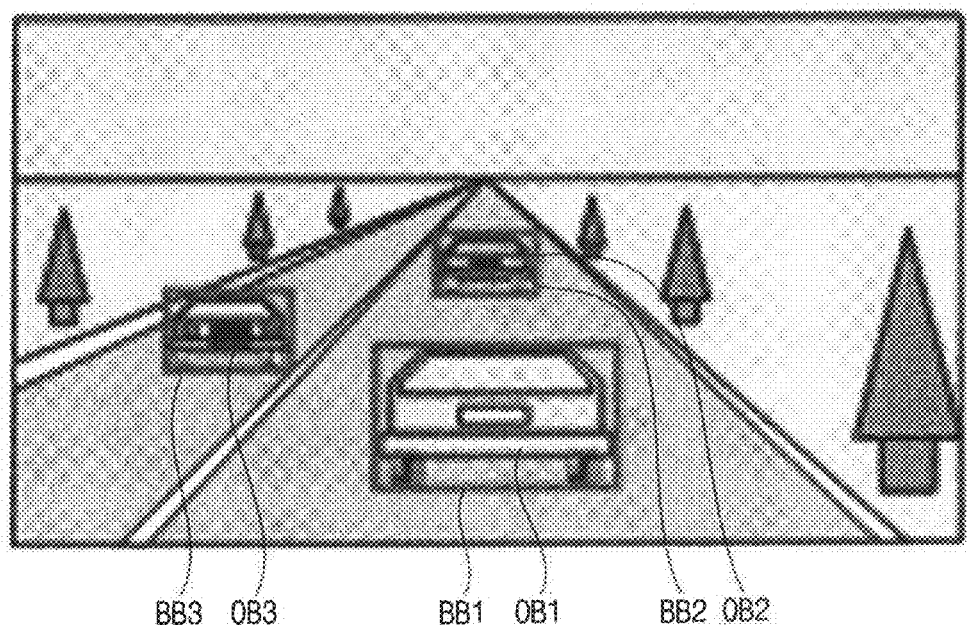
FIGS. 14 and 15 illustrate examples of a final image in the processing circuit in FIG. 9.
Figure 15:
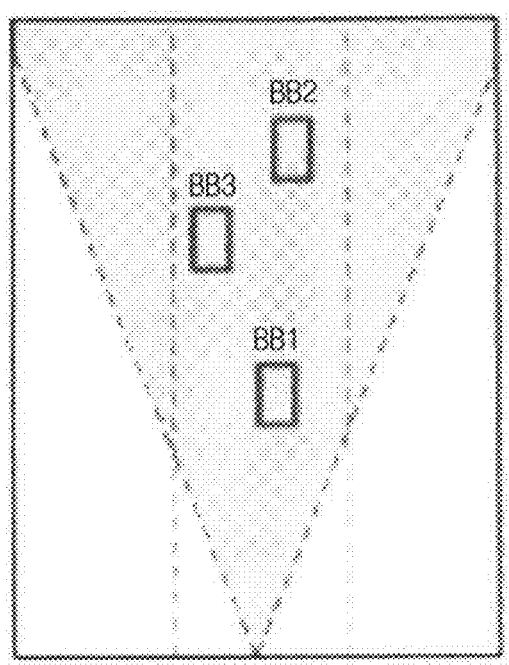

FIGS. 14 and 15 illustrate examples of the final image in the processing circuit in FIG. 9.

Referring to FIGS. 9 and 14, the box predictor 470 may mark the objects OB1, OB2 and OB2 with bounding boxes BB1, BB2 and BB3 in the final image FIMG and output a final image FIMG1 marked with the bounding boxes BB1, BB2 and BB3.

Referring to FIGS. 9 and 15, in an exemplary embodiment, the box predictor 470 may convert the final image FIMG in three-dimension to a bird-eye view image in two-dimensions, and mark the object in the bird-eye view image with the bounding boxes BB1, BB2 and BB3 to generate a final image FIMG2 marked with the bounding boxes BB1, BB2 and BB3. For example, the bird-eye view image my be a top-down view.

In an exemplary embodiment, the processing circuit 1000d determines whether a driving event occurs based on sequential changes with respect to the bounding boxes BB1, BB2 and BB3 and may provide a user with a notification message notifying the driving event. For example, an imminent collision could be concluded if a distance between edges of two bounding boxes become a certain distance or less.

Figure 16:
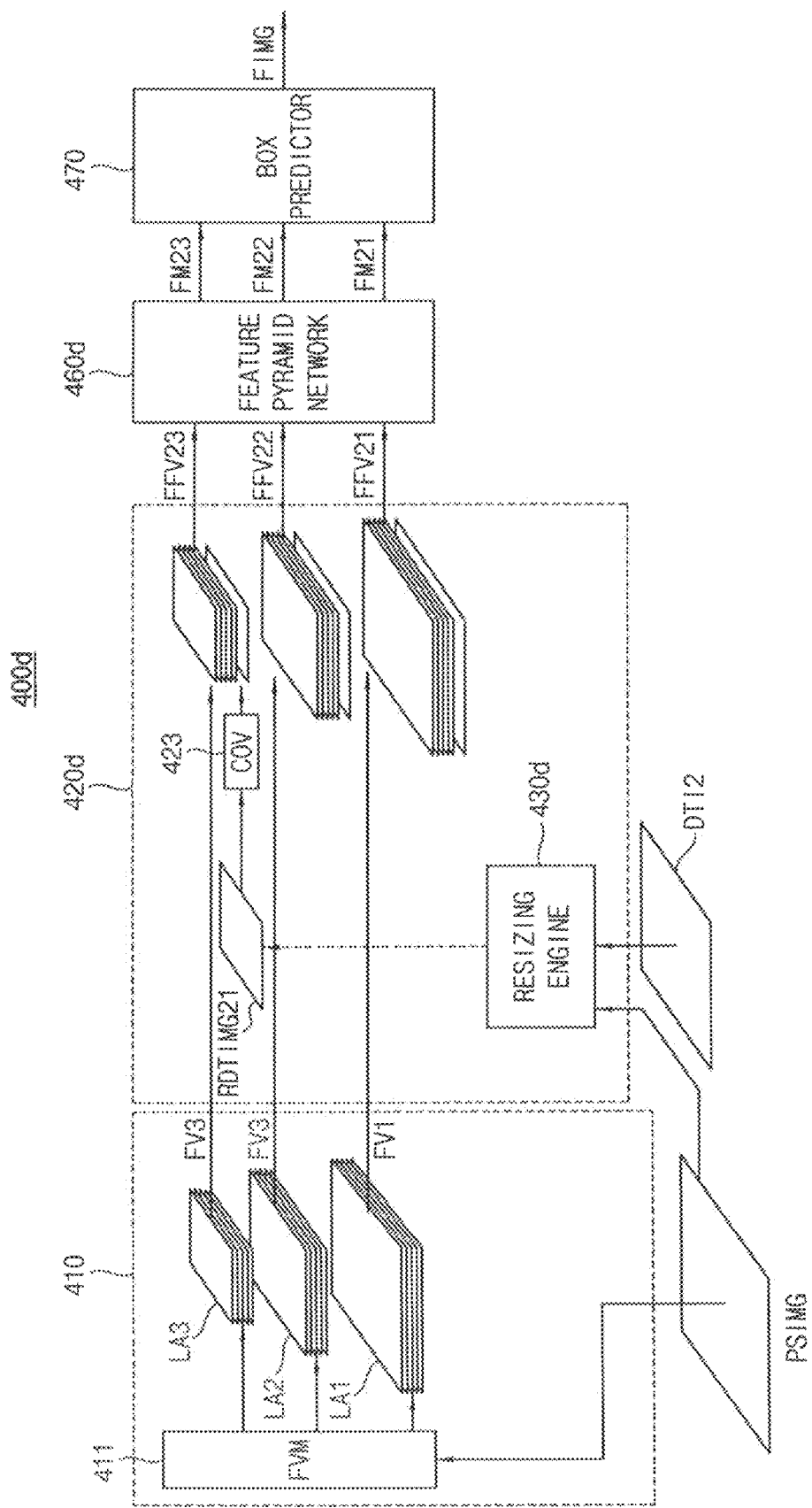
FIG. 16 is a block diagram illustrating another example of the object detection module of FIG. 4A according to an exemplary embodiment of the inventive concept.

FIG. 16 is a block diagram illustrating another example of the object detection module of FIG. 4A according to an exemplary embodiment of the inventive concept.

Referring to FIG. 16, the object detection module 400d includes the feature extractor 410, the sensor fusing engine 420d, the feature pyramid network 460d and the box predictor 470.

In FIG. 16, the pre-processed stereo image PSIMG has a first resolution and the depth information DTI2 has a second resolution which is the same as the first resolution.

The feature extractor 410 includes FEM 411 and a plurality of layers LA1, LA2 and LA3 and may extract features of at least one object from the pre-processed stereo image PSIMG by the using the FEM 411 and the layers LA1, LA2 and LA3 to provide feature vectors FV1, FV2 and FV3.

The sensor fusing engine 420d may include a resizing engine 430d and may resize the depth information DTI2 having a second resolution to generate a resized depth image RDTIMG21, and may fuse the feature vectors FV1, FV2 and FV3 and the resized depth image RDTIMG21 by using at least one convolution layer 423 to generate fused feature vectors FFV21, FFV22 and FFV23.

The sensor fusing engine 420d may further include at least one down sampler (not shown), may perform down-sampling on the resized depth image RDTIMG21 at least once to generate at least one down-sampled resized depth image and may fuse the feature vectors FV1, FV2 and FV3 and the down-sampled resized depth image by using the convolution layer 423 to generate the fused feature vectors FFV21, FFV22 and FFV23.

The feature pyramid network 460d may generate feature maps FM21, FM22 and FM23 based on the fused feature vectors FFV21, FFV22 and FFV23 and the box predictor 470 may provide the final image FIMG or the bounding box BB based on the feature maps FM21, FM22 and FM23.

Figure 17:
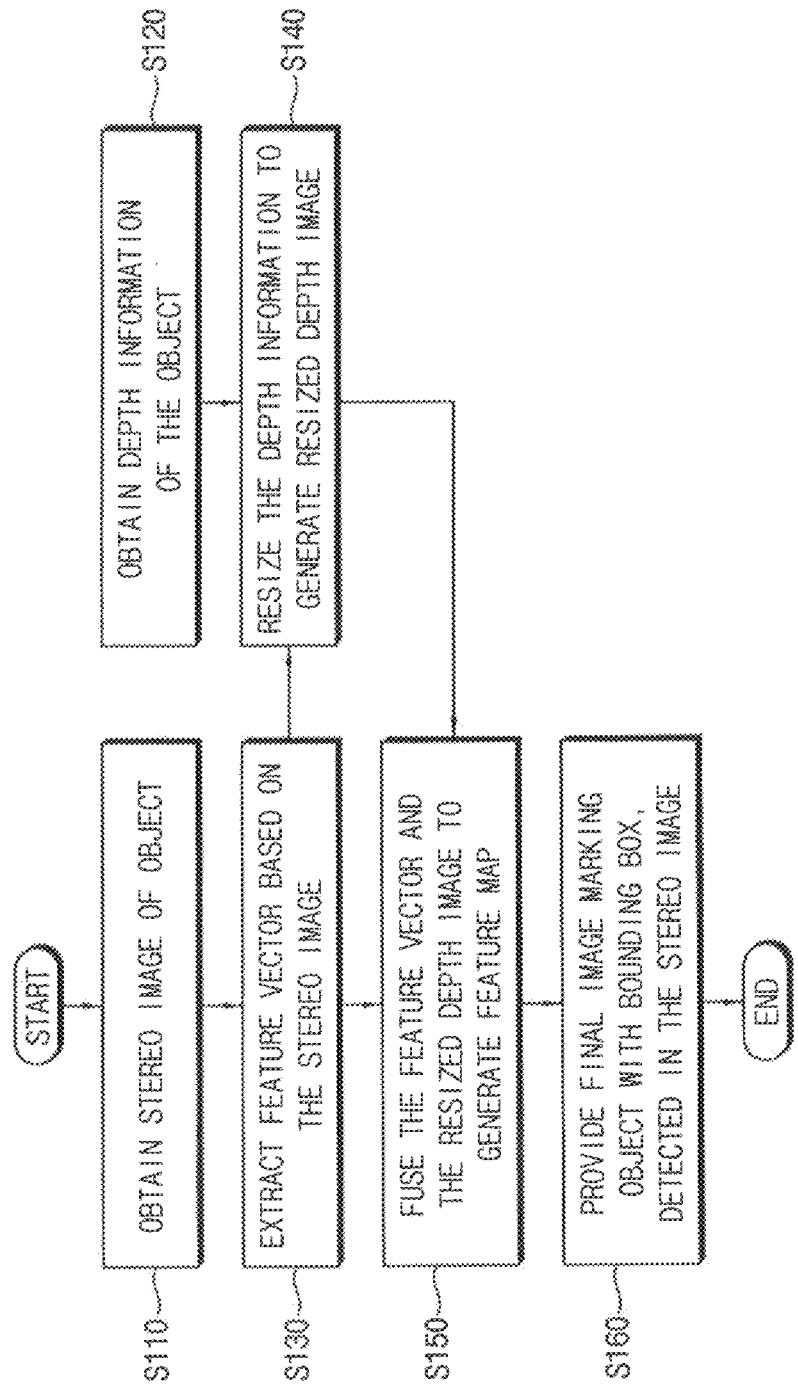
FIG. 17 is a flow chart illustrating an operation of the ADAS in FIG. 2A according to an exemplary embodiment of the inventive concept.

FIG. 17 is a flow chart illustrating an operation of the ADAS in FIG. 2A according to an exemplary embodiment of the inventive concept.

Referring to FIGS. 2A through 17, the processing circuit 1000a obtains a stereo image SIMG of an object from the stereo camera 110 in operation S110, and obtains depth information (e.g., distance information) one of the object in operation S120. The depth information may be determined from radar reflected waves received by the first sensor 120.

The processing circuit 1000a extracts features of the object from the stereo image SIMG to generate a feature vector FV in operation S130. The processing circuit 1000a resizes the depth information to generate a resized depth image in operation S140.

The processing circuit 1000a fuses the feature vector FV and the resized depth image to generate a fused feature vector FFV and generates a feature map FM based on the fused feature vector FFV in operation S150. The processing circuit 1000a detects the object in the stereo image SIMG to provide a final image FIMG including the detected object surrounded by a bounding box BB in operation S160.

Figure 18:
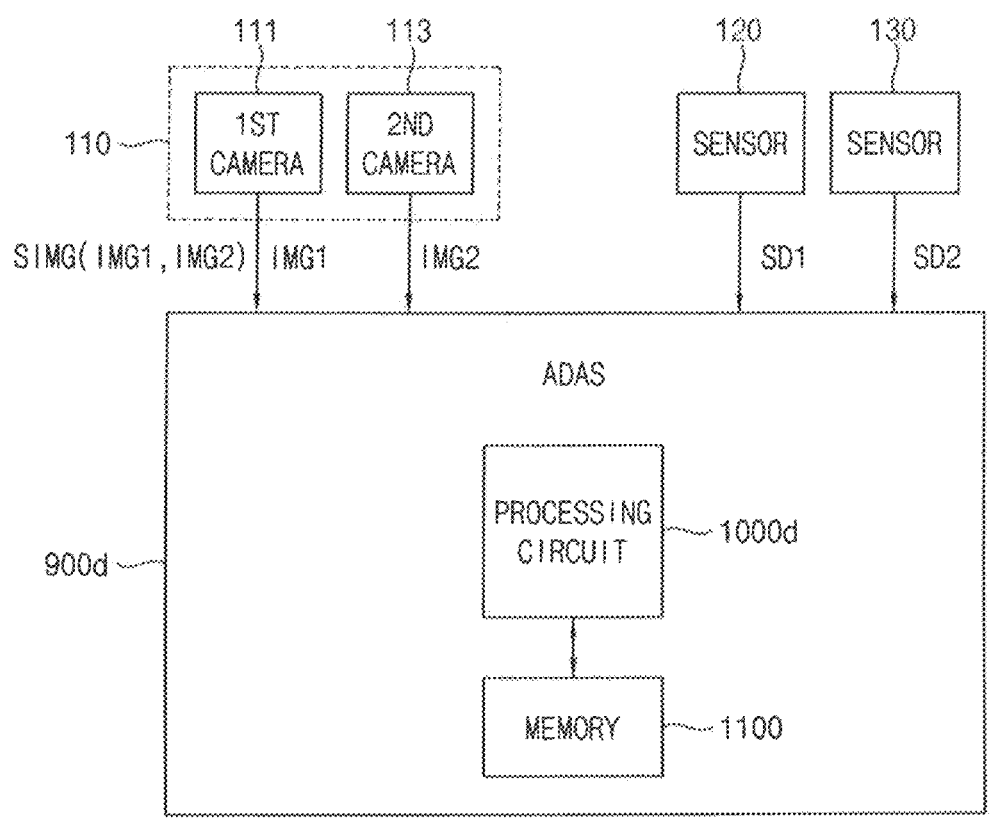
FIG. 18 is a block diagram illustrating another example of an ADAS according to an exemplary embodiment of the inventive concept.

FIG. 18 is a block diagram illustrating another example of an ADAS according to an exemplary embodiment of the inventive concept.

Referring to FIG. 18, an ADAS 900d includes a processing circuit 1000d and a memory 1100.

In FIG. 18, a first sensor 110, a second sensor 120 and a third sensor 130 which are mounted in the vehicle 100 are illustrated together for convenience of explanation. The first sensor 110 may be a stereo camera and may include a first camera 111 and a second camera 113. The second sensor 120 may be a radar to generate distance information and the third sensor 130 may be a LiDAR to generate depth information.

The processing circuit 1000d in FIG. 18 differs from the processing circuit 1000a in FIG. 2A in that the processing circuit 1000d further receives second sensing data SD2 from the third sensor 130, which is a LiDAR sensor.

The third sensor 130, which is a LiDAR sensor, emits light, receives reflected light from an object in response to the emitted light, and provides the reflected light to the processing circuit 1000b as the second sensing data SD2. For example, the LiDAR sensor may emit multiple pulses of laser light at a high frequency.

The memory 1100 stores instructions executable by the processing circuit 1000d and the processing circuit 1000d executes the instructions to cause the ADAS 900d to obtain, from the vehicle 100, a stereo image SIMG captured while driving the vehicle 100, to obtain the first sensing data SD1 and the second sensing data SD2 to generate depth information on the at least one object in the stereo image SIMG, to fuse the stereo image SIMG and the depth information to generate fused information, to detect the at least one object in the stereo image SIMG based on the fused information, and to mark the detected object with a bounding box.

Figure 19:
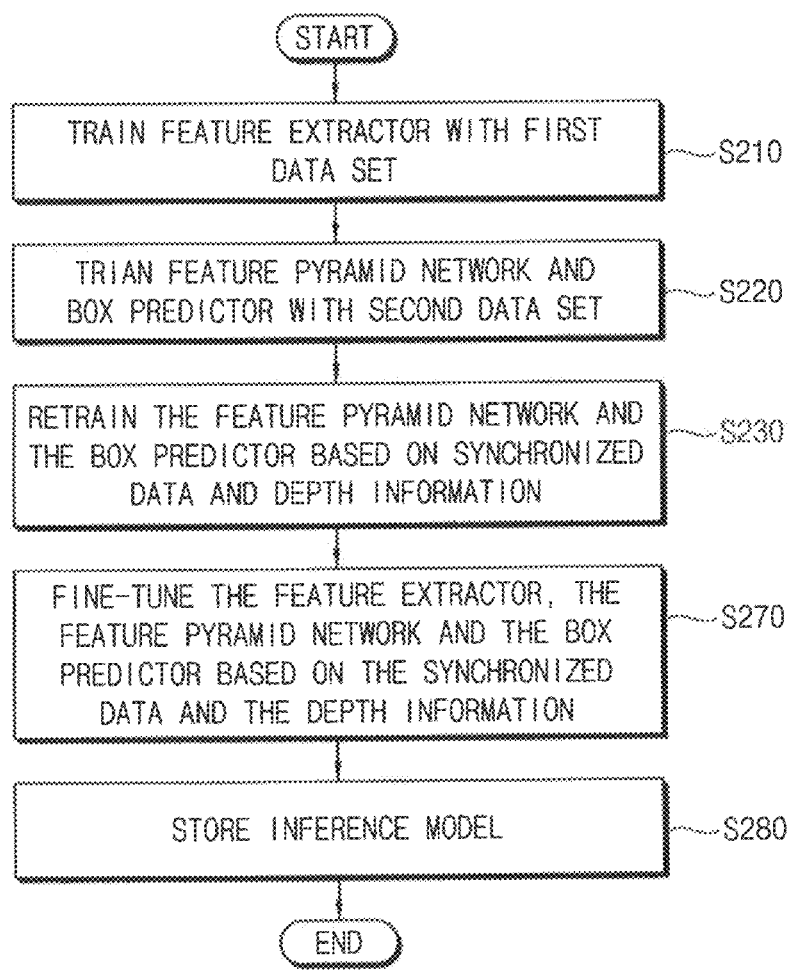
FIG. 19 is a flow chart illustrating a method of calibrating the ADAS according to an exemplary embodiment of the inventive concept.

FIG. 19 is a flow chart illustrating a method of calibrating the ADAS according to an exemplary embodiment of the inventive concept.

Particularly, FIG. 19 is a flow chart illustrating a method of calibrating an object detection module in a processing circuit in the ADAS.

Referring to FIGS. 3A through 6B, 16 and 19, a feature extractor 410 in the object detection module 400a of the processing circuit 1000a in the ADAS 900a is trained with a first data set associated with object classifying in operation S210. A feature pyramid network 460 and a box predictor 470 in the object detection module 400a are trained with a second data set associated with object detection in operation S220. A size of the second data set may be smaller than a size of the first data set. Since the feature pyramid network 460 and the box predictor 470 are trained with the second data set, time for training the feature pyramid network 460 and the box predictor 470 may be reduced.

The feature pyramid network 460 and the box predictor 470 are retrained with depth information and synchronized sensing data associated with at least one trained object in operation S230. The synchronized sensing data may be a third data set.

Fine-tuning is performed on the feature extractor 410, the feature pyramid network 460 and the box predictor 470 based on the synchronized sensing data and the depth information in operation S270.

An inference model, obtained as a result of the fine-tuning of the object detection module 400a, is stored in a memory 1000 coupled to the processing circuit 1000a in operation S280.

Figure 20:
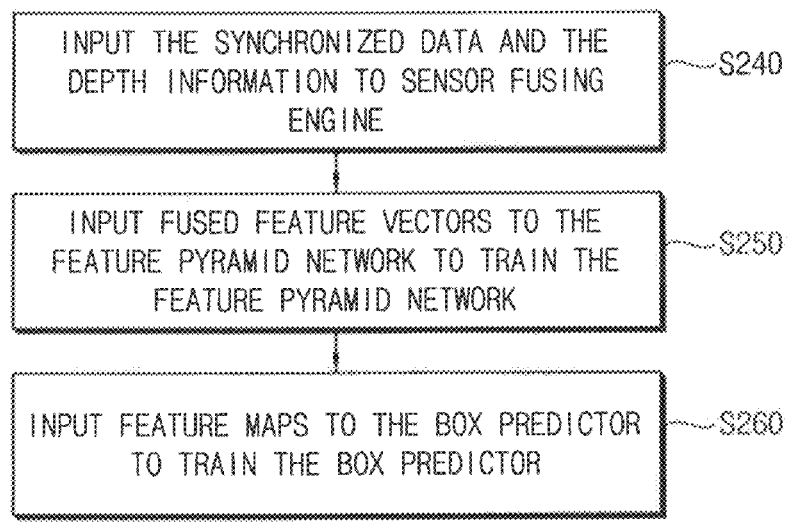
FIG. 20 is a flow chart illustrating an operation of retraining the feature pyramid network and the box predictor in FIG. 19 according to an exemplary embodiment of the inventive concept.

FIG. 20 is a flow chart illustrating operation of retraining the feature pyramid network and the box predictor in FIG. 19 according to an exemplary embodiment of the inventive concept.

Referring to FIG. 20, for retraining the feature pyramid network 460 and the box predictor 470 in operation S230, the depth information and the synchronized sensing data are input to a sensor fusion engine 420 connected between the feature extractor 460 and the feature pyramid network 470 in operation S240.

Fused feature vectors FFV output from the sensor fusion engine 420 are input to the feature pyramid network 460 to train the feature pyramid network 460 in operation S250. Feature maps FM output from the feature pyramid network 460 are input to the box predictor 470 to train the box predictor 470 in operation S260.

Figure 21:
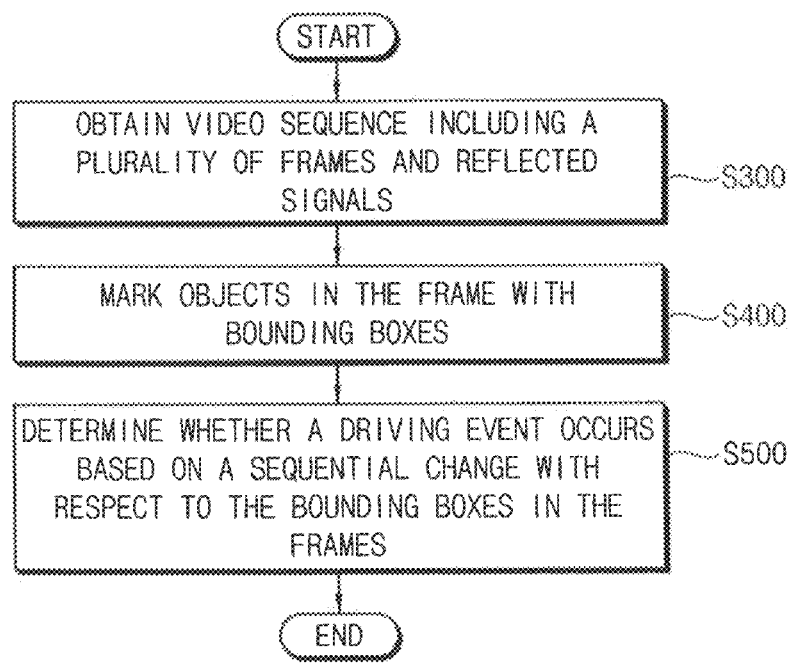
FIG. 21 is a flowchart illustrating a method of determining whether an event occurs in the ADAS according to an exemplary embodiment of the inventive concept.

FIG. 21 is a flowchart illustrating a method of determining whether an event occurs in the ADAS according to an exemplary embodiment of the inventive concept.

In operation S300, the ADAS 900a obtain a video sequence including a plurality of frames from, for example, a camera mounted in a vehicle, and obtains reflected signals from at least one sensor mounted in the vehicle. The ADAS 900a may generate depth information based on the video sequence and the reflected signals.

The video sequence may include a series of still images. Each of the still images may refer to a picture or a frame.

In operation S400, the ADAS 900a marks at least one detected object in the frames with a bounding box. For example, the ADAS 900a may fuse information of the frames with the depth information generate fused information and detect the at least object using the fused information. According to an exemplary embodiment, the ADAS 900a may detect one or more objects from one frame included in the video sequence. The one or more objects detected from the frame may be detected from another frame included in the same video sequence. In an embodiment, the one or more objects detected from a given frame is not detected from another frame included in the same video sequence.

According to an exemplary embodiment, the ADAS 900a obtains location information of the object using, for example, an artificial intelligence (AI) learning model. For example, the ADAS 900a may recognize where a first vehicle is located in the first frame based on a bounding box of the first vehicle in the first frame. In addition, the ADAS 900a may recognize a distance between the first vehicle and a second vehicle using the bounding box of the first vehicle and a bounding box of the second vehicle in the first frame. In addition, the ADAS 900a may recognize an amount of change in a distance between the first vehicle and the second vehicle in a second frame using the bounding box of the first vehicle and the bounding box of the second vehicle in the second frame.

According to an exemplary embodiment, the ADAS 900a is configured to determine a type of the object. The ADAS 900a may determine whether the object is noise, based on information about an available size of the type of the object in a location in which the object is recognized.

According to an exemplary embodiment, the ADAS 900 uses a first trained model in order to detect an object included in a frame and a location of the object. According to an exemplary embodiment, the first trained model is obtained based on a result of learning by detecting the object in a video sequence including the plurality of frames captured during driving of a vehicle and marking the detected object with a bounding box. Thus, when the frames obtained from the video sequence are input in the first trained model, the bounding box designating the object detected from the frames may be output from the first trained model.

In operation S500, the ADAS 900a determines whether a driving event of a vehicle occurs, by analyzing a sequential change in the bounding boxes of the objects in the plurality of frames.

According to an exemplary embodiment, the ADAS 900a analyzes the change in the location of the bounding box between a previous frame and a next frame, based on a display order of the video sequence. For example, the ADAS 900a may analyze the change in the location of the bounding box, by comparing location information of the bounding box of an object included in the first frame, which is displayed first, and location information of the bounding box of the same object included in the second frame, which is displayed next. For example, the ADAS 900a may determine whether an event occurs, by analyzing the change in the location of each of the plurality of objects according to time.

According to an exemplary embodiment, the ADAS 900a determines a type of the event by analyzing the sequential change in the bounding boxes of the objects in the plurality of frames. According to an exemplary embodiment, the ADAS 900a determines a level of risk of driving by analyzing the sequential change in the bounding boxes of the objects in the plurality of frames.

According to an exemplary embodiment, the ADAS 900a uses a second trained model to determine whether an event occurs. When an output value related to an object that is output from the first trained model is input in the second trained model, whether an event occurs may be determined based on the output value.

According to an exemplary embodiment, the operation of detecting the object, the operation of marking object with the bounding box, and the operation of determining whether an event occurs may be performed using a plurality of trained models.

Figure 22:
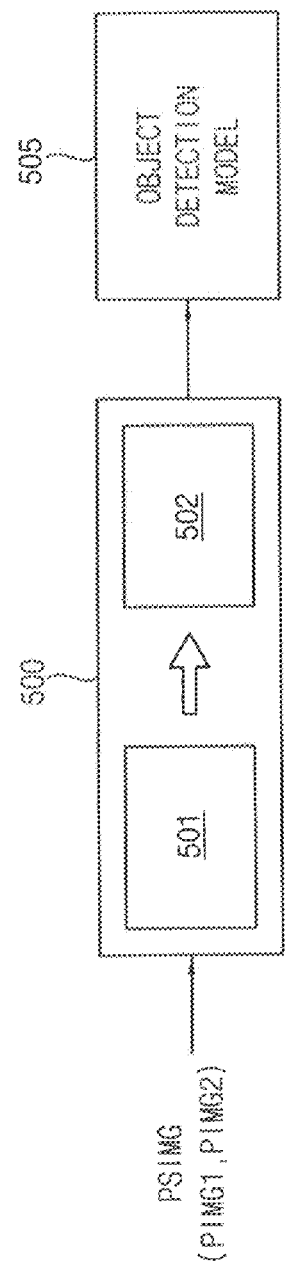
FIG. 22 is a diagram illustrating an operation of generating a trained model which determines whether a driving event of a vehicle occurs, according to an exemplary embodiment of the inventive concept.

FIG. 22 is a diagram illustrating an operation of generating a trained model which determines whether a driving event of a vehicle occurs, according to an exemplary embodiment of the inventive concept.

According to an exemplary embodiment, an event detection model (e.g., including processing circuitry and/or program elements) 505 which detects a driving event of a vehicle based on a location of an object may be generated by training a first trained model (e.g., including processing circuitry and/or program elements) 501 and a second trained model (e.g., including processing circuitry and/or program elements) 502 using at least one of the first pre-processed viewpoint image PIMG1 and the second pre-processed viewpoint image PIMG2 in the pre-processed stereo image PSIMG.

According to an exemplary embodiment, the first trained model 501 may include various processing circuitry and/or program elements and be generated by learning a classifier for determining a type of an object and a classifier for determining a location of a bounding box of the object in each of a plurality of frames, using, for example, and without limitation, a fully convolutional network (FCN), or the like.

According to an exemplary embodiment, the ADAS 900a may input to the first trained model 501 at least one of the first pre-processed viewpoint image PIMG1 and the second pre-processed viewpoint image PIMG2, which includes frames including RGB channels. The first trained model 501 may be trained to detect an object in at least one of the first pre-processed viewpoint image PIMG1 and the second pre-processed viewpoint image PIMG2 and to mark the detected object with a bounding box by using the object detection module 400a of FIG. 4A.

The ADAS 900a may detect an object in at least one of the first pre-processed viewpoint image PIMG1 and the second pre-processed viewpoint image PIMG2 and may mark the detected object with a bounding box by using the first trained model 501. The ADAS 900a may detect objects in one frame and determine a type of each of the objects using the first trained model 501.

The second trained model 502 may be generated by learning a classifier for determining whether a driving event of a vehicle occurs by analyzing a sequential change in the bounding box in the plurality of frames, using, for example, and without limitation, at least one of various neural networks. The output of the first trained model 501 may be used as an input of the second trained model 502. According to an exemplary embodiment, the ADAS 900 may use a matrix generated by reducing a dimension of the matrix output from the first trained model, as the input of the second trained model, in order to reduce the amount of operations of the second trained model 502 which determines whether an event occurs. For example, a dilated convolution, or the like, may be used to reduce the dimension of the matrix.

According to exemplary embodiments, the processing circuits 1000a, 1000b, 1000c or 1000d may obtain a first trained model based on a result of detecting a learning object from a video sequence including a plurality of learning frames captured while driving a learning vehicle, may detect the at least one object in the stereo image by using the obtained first trained model and may mark the detected object with a bounding box.

Figure 23:
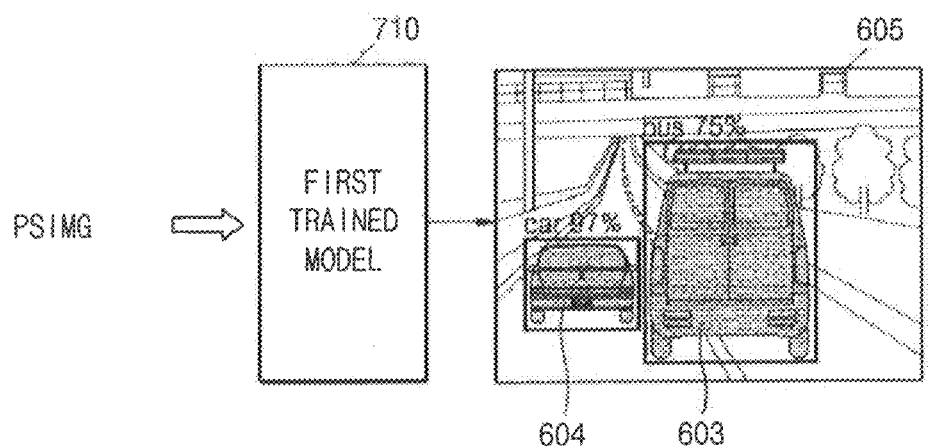
FIG. 23 is a diagram illustrating an example of detecting an object using a first trained model according to an exemplary embodiment of the inventive concept.

FIG. 23 is a diagram illustrating an example of detecting an object using a first trained model according to an exemplary embodiment of the inventive concept.

Referring to FIG. 23, the ADAS 900a detects an object in a frame and marks the detected object with a bounding box using a first trained model 710 learned using, as an input value, a pre-processed stereo image PSIMG including a plurality of frames obtained during driving of a vehicle.

According to an exemplary embodiment, since the first trained model 710 may use a FCN, the ADAS 900a may output a type of the object and the bounding box when the pre-processed stereo image PSIMG is input to the first trained model 710.

According to an exemplary embodiment, when a series of matrices output from the first trained model 710 are generated into an image, a video sequence 605 in which objects included in the video sequence 605 are indicated in different colors based on types thereof may be obtained. For example, a road forming a constant pattern and a vehicle that is a moving object may be indicated in different colors.

According to an exemplary embodiment, the ADAS 900a detects a type of the object and a level of accuracy of object recognition. For example, the ADAS 900a may determine types and locations of a first object 603 and a second object 604 in the video sequence 605 output from the first trained model 710. For example, as shown in FIG. 23, the ADAS 900a recognized with a level of accuracy of 75% that the first object 603 is a bus using information about a shape and a location of the first object 603, and recognized with a level of accuracy of 97% that the second object 604 is a car using information about a shape and a location of the second object 604.

Figure 24:
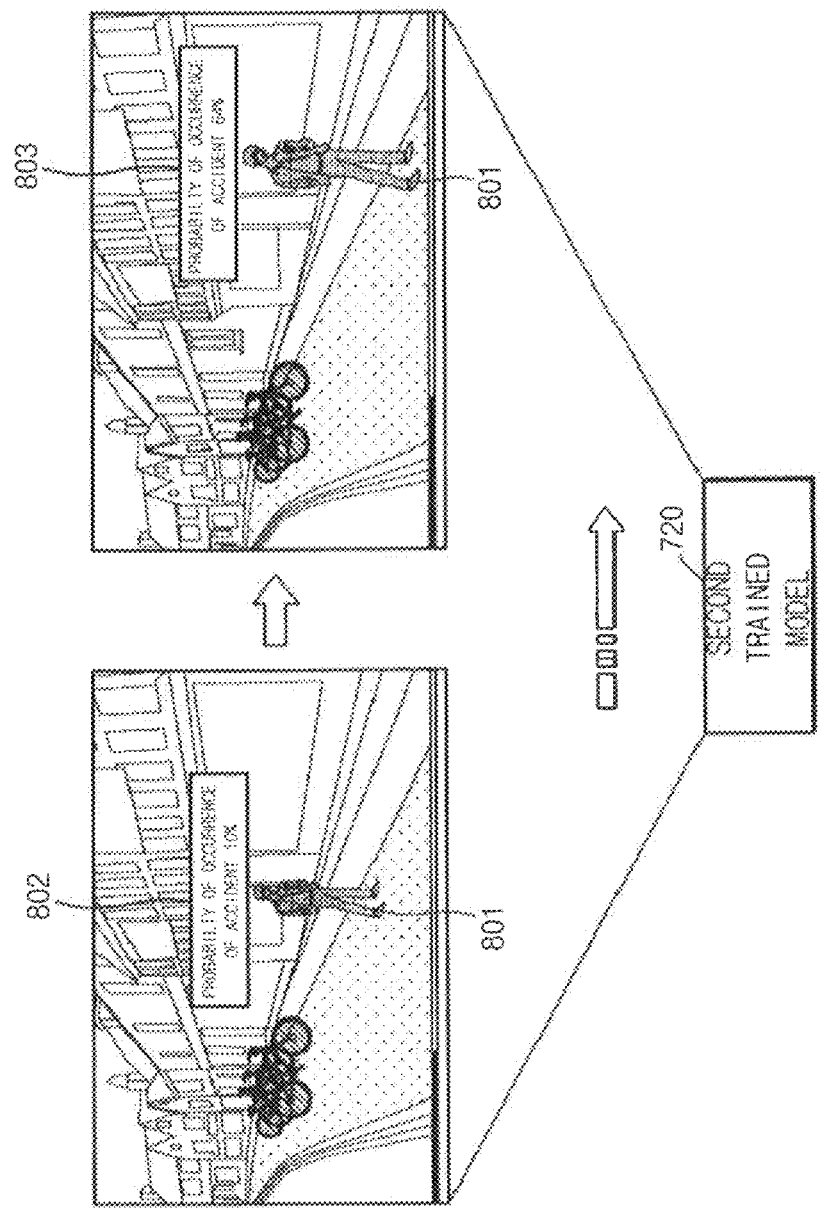
FIG. 24 is a diagram illustrating an example of determining whether an event occurs based on sequential movement of an object using a second trained model according to an exemplary embodiment of the inventive concept.

FIG. 24 is a diagram illustrating an example of determining whether an event occurs based on sequential movement of an object using a second trained model according to an exemplary embodiment of the inventive concept.

According to an exemplary embodiment, when frames including the object including the location information, output from the first trained model 710, are input in the second trained model 720, it may be determined whether an event related to the object occurs.

According to an exemplary embodiment, the second trained model 720 may use, for example, and without limitation, an recursive neural network (RNN), which may refer, for example, to a neural network in which nodes are recurrently connected to one another in different temporal sections. The RNN may recognize sequential data.

The RNN may be trained via supervised learning in which learning data and output data corresponding thereto are input to the neural network and connection weights of connecting lines are modified and refined so that the output data corresponding to the learning data is output. For example, the RNN may modify and refine the connection weights between neurons based on a delta rule and back propagation learning.

For example, the second trained model 720 may recognize a bounding box marking an object 801, which is located closer to the driving vehicle in the next frame than in the previous frame, and may determine that a collision between the object 801 and the driving vehicle is likely to occur.

According to an embodiment, the second trained model 720 may predict a probability of occurrence of an event based on an object, by analyzing a sequential change in a bounding box of the object. For example, the second trained model 720 may determine a probability of occurrence of an accident based on a distance between the object 801 and a vehicle, the distance being determined based on the location of the object 801. According to an exemplary embodiment, when the second trained model 720 determines that the distance between the object 801 and the vehicle is great, the second trained model 720 may determine that the probability of the occurrence of the accident is 10% as described in operation 802. When the second trained model 720 determines that the distance between the vehicle and the object 801 has decreased as the vehicle and the object 801 move according to time, the second trained model 720 may determine that the probability of the occurrence of the accident is 64% as described in operation 803. According to an exemplary embodiment, the probability of the occurrence of the accident based on the movement of the vehicle and the object 801 according to time may be learned by the second trained model 720.

According to exemplary embodiments, the processing circuit 1000a, 1000b, 1000c or 1000d may obtain a second trained model based on a result of learning whether a driving event of a learning vehicle occurs based on a sequential change with respect to a bounding box indicating an object in a plurality of learning frames, and may determine whether the driving event of the vehicle with respect to the object occurs using the obtained second trained model.

FIG. 25 is a block diagram illustrating an electronic device according to an exemplary embodiment of the inventive concept.

Referring to FIG. 25, an electronic device 950 includes a processing circuit 1000, a communication interface (e.g., including communication circuitry) 1500, and a memory 1000. The electronic device 950 may further include an input interface (e.g., including input circuitry) 1700, an output interface (e.g., including output circuitry) 1200, a sensor 1400, and an audio/video (NV) input interface (e.g., including A/V input circuitry) 1600.

The input interface 1700 may receive an input for controlling an operation of a module mounted in a vehicle.

The output interface 1200 may include various circuitry to output an audio signal, a video signal, and/or a vibration signal, and may include a display 1210, a sound output interface (e.g., including sound output circuitry) 1220, and a vibration motor 1230. According to an embodiment, the output interface 1200 may output a notification message as an audio, a video, and/or a vibration.

The display 1210 may display and output information processed in the electronic device 1000. For example, the display 1210 may display a notification message on a head up display (HUD) of a vehicle. The sound output interface 1220 may include various circuitry to output audio data received from the communication interface 1500 or stored in the memory 1100. Also, the sound output interface 1220 may output a sound signal (for example, a call signal reception sound, a message reception sound, a notification sound) related to functions performed in the electronic device 950. For example, the sound output interface 1220 may output an alarm sound for notifying about occurrence of an event.

The processing circuit 1000 may include various processing circuitry and control general operations of the electronic device 950, in general. For example, the processing circuit 1000 may generally control the user input interface 1700, the output interface 1200, the sensor 1400, the communication interface 1500, the A/V input interface 1600, or the like, by executing programs stored in the memory 1100. Also, the processing circuit 1000 may perform the functions of the electronic device 950, by executing the programs stored in the memory 1100. The processing circuit 1000 may include at least one processor. The processing circuit 1000 may include a plurality of processors or a single integrated processor, based on functions and operations thereof. According to an exemplary embodiment, the processing circuit 1000 includes at least one processor configured to execute at least one program stored in the memory 1100 to provide a notification message. The processing circuit 1000 may obtain a video sequence including a plurality of frames from a camera mounted in a vehicle via the communication interface 1500. The processing circuit 1000 may transmit a command configured to control an operation of a module mounted in a vehicle to the module mounted in the vehicle, based on a type of an event and a level of risk of driving the vehicle, via the communication interface 1500.

The sensor 1400 may include various sensors and sensing circuitry to sense a state of the electronic device 950, a state of a user, or a state around the electronic device 950, and may transmit sensed information to the processing circuit 1000 based on the sensed states.

The sensor 1400 may include various sensing circuitry, such as, for example, and without limitation, at least one of a magnetic sensor 1410, an acceleration sensor 1420, a temperature/humidity sensor 1430, an infrared sensor 1440, a gyroscope sensor 1450, a position sensor (for example, global positioning system (GPS)) 1460, an atmospheric sensor 1470, a proximity sensor 1480, and an RGB sensor 1490, but is not limited thereto.

The communication interface 1500 may include various communication circuitry including at least one component configured to enable the electronic device 950 to communicate with another electronic device (not shown) and a server (not shown). The other electronic device may be a computing device or a sensor, but is not limited thereto. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy communication interface (BLU), a near-field communication interface (NFC/RFID), a WLAN (Wi-fi) communication interface, a Zigbee communication interface, an infrared data association (IrDA) communication interface (not shown), a Wi-fi direct (WFD) communication interface, a ultra wideband (UWB) communication interface, an Ant+ communication interface, or the like, but is not limited thereto.

According to an exemplary embodiment, the communication interface 1500 receives the video sequence including the plurality of frames from the camera mounted in the vehicle. The communication interface 1500 may transmit a command for controlling an operation of a module mounted in the vehicle to the module mounted in the vehicle.

The A/V input interface 1600 may include various A/V interface circuitry and is configured to input an audio signal or a video signal, and may include a camera 1610, a microphone 1620, or the like. The camera 1610 may obtain an image frame, such as a still image or a video, via an image sensor, in a videotelephony mode or a photographing mode. The image captured by the image sensor may be processed by the processing circuit 1000 or an additional image processor (not shown). For example, the image captured by the camera 1610 may be used as information for determining whether an event occurs.

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1100 may store programs for the processing and controlling operations of the processing circuit 1000, and may store data that is input to the electronic device 950 or output from the electronic device 950.

The memory 1100 may include at least one type of storage medium from among a flash memory type, a hard disk type, and a multimedia card micro type. The programs stored in the memory 1100 may be divided into a plurality of modules based on their functions. For example, the programs may be divided into a user interface (UI) module 1110, a touch screen module 1120, and a notification module 1130.

The UI module 1110 may provide a specialized UI, a graphic user interface (GUI), etc., which are synchronized to the electronic device 950, for each application. The touch screen module 1120 may sense a touch gesture on a touch screen via the user, and transmit information related to the touch gesture to the processing circuit 1000. The touch screen module 1120 according to an embodiment recognizes a touch code associated with a certain touch gesture or touch position and analyzes the touch code. The touch screen module 1120 may be implemented as additional hardware including a controller.

The notification module 1130 may generate a signal to notify about occurrence of an event. The notification module 1130 may output the notification signal as a video signal via the display 1210, output the notification signal as an audio signal via the sound output interface 1220, or output the notification signal as a vibration signal via the vibration motor 1230.

The above-described exemplary embodiments may be implemented by hardware components, software components or combinations of the hardware components and the software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples, multiple processors or computers may be used, or a processor or computer may include multiple processing elements, or multiple types of processing elements, or both. For example, a single hardware component or two or more hardware components may be implemented by a single processor, or by two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components.

Exemplary embodiments may be employed in an ADAS which detects an object based on artificial neural network or in automatic driving device.

The foregoing is illustrative of exemplary embodiments of the inventive concept and is not to be construed as limiting thereof. Although some exemplary embodiments have been described, those skilled in the art will readily appreciate that many modifications are possible in the example embodiments without materially departing from the present disclosure. Accordingly, all such modifications are intended to be included within the scope of the present disclosure.

What is claimed is:

1. An advanced driver assist system (ADAS), comprising:
a processing circuit; and
a memory storing instructions executable by the processing circuit,
wherein the processing circuit is configured to execute the instructions to cause the ADAS to:
capture, from a vehicle, a video sequence including a plurality of frames while driving the vehicle, wherein each of the frames corresponds to a stereo image including a first viewpoint image and a second viewpoint image;
determine depth information in the stereo image based on reflected signals received while driving the vehicle;
extract features from the stereo image having a first resolution to generate feature vectors;
increase a resolution of the depth information having a second resolution according to the first resolution to generate a resized depth image;
fuse the feature vectors and the resized depth image using a plurality of convolutional layers of a convolutional neural network to generate fused feature vectors; and
detect at least one object included in the stereo image using the fused feature vectors.

2. The ADAS of claim 1, wherein the processing circuit is further configured to execute the instructions to cause the ADAS to:
generate feature maps on the at least one object based on the fused feature vectors; and
detect the at least one object based on the feature maps to provide a final image including the detected at least one object or to provide a bounding box indicating the detected at least one object.

3. The ADAS of claim 2, wherein the first resolution is greater than the second resolution.

4. The ADAS of claim 2, wherein the processing circuit is configured to perform down-sampling on the resized depth image at least once to generate a down-sampled depth image and configured to fuse the down-sampled depth image and the feature vectors.

5. The ADAS of claim 2, wherein the processing circuit is configured to mark the at least one object with the bounding box by using at least one of a single shot detector (SSD) and a faster recurrent convolution neural network (R-CNN).

6. The ADAS of claim 1, wherein the processing circuit is further configured to execute the instructions to cause the ADAS to:

generate feature maps on the at least one object based on the fused feature vectors; and provide a final image including the detected at least one object marked with a bounding box based on the feature maps.

7. The ADAS of claim 6, wherein the first resolution is the same as the second resolution.

8. The ADAS of claim 6, wherein the processing circuit is configured to perform down-sampling on the resized depth image at least once to generate a down-sampled resized depth image and configured to fuse the down-sampled depth image and the feature vectors.

9. The ADAS of claim 1, wherein the processing circuit is further configured to execute the instructions to cause the ADAS to:

obtain a first trained model based on a result of detecting a learning object from a video sequence including a plurality of learning frames captured while driving a learning vehicle; and detect the at least one object in the stereo image by using the obtained first trained model.

10. The ADAS of claim 1, wherein the processing circuit is further configured to execute the instructions to cause the ADAS to:

determine a moving speed and a moving direction of the at least one object based on a sequential change with respect to a bounding box indicating an object in the plurality of frames; and determine a type of a driving event of the vehicle and a level of risk of driving the vehicle based on the moving speed and the moving direction of the at least one object.

11. The ADAS of claim 10, wherein the processing circuit is further configured to execute the instructions to cause the ADAS to output a notification message about the driving event based on the type of the driving event and the level of risk of driving the vehicle.

12. The ADAS of claim 1, wherein the processing circuit comprises:

an image pre-processor configured to pre-process the stereo image to output a pre-processed stereo image including a first pre-processed viewpoint image and a second pre-processed viewpoint image;

a depth information generation engine configured to generate the depth information on the at least one object based on the reflected signals; and an object detection module configured to fuse the stereo image and the depth information to generate the fused information, detect the at least one object based on the fused information, and to output a final image including the detected at least one object or to output a bounding box indicating the detected at least one object.

13. The ADAS of claim 12, wherein the object detection module comprises:

a feature extractor including a plurality of layers, and configured to extract features of the at least one object from the stereo image having a first resolution by using the plurality of layers to provide feature vectors;

a sensor fusion engine configured to fuse the feature vectors and the depth information having a second resolution to generate fused feature vectors on the at least one object;

a feature pyramid network configured to generate feature maps on the at least one object based on the fused feature vectors; and a box predictor configured to detect the at least one object based on the feature maps to provide the final image including the detected at least one object or to provide the bounding box.

14. The ADAS of claim 13, wherein:

the first resolution is greater than the second resolution; and the sensor fusion engine is configured to increase a size and a resolution of the depth information having the second resolution with respect to the first resolution to generate a resized depth image and configured to fuse the feature vectors and the resized depth image by using a plurality of convolution layers.

15. The ADAS of claim 13, wherein:

the first resolution is the same as the second resolution; and the sensor fusion engine is configured perform down-sampling on the resized depth image at least once to generate a down-sampled depth image and configured to fuse the down-sampled depth image and the feature vectors by using a plurality of convolution layers.

16. A method of detecting an object in an advanced driver assist system (ADAS), the method comprising:

capturing, by a first sensor of a vehicle, a video sequence including a plurality of frames while driving the vehicle, wherein each of the frames corresponds to a stereo image including a first viewpoint image and a second viewpoint image;

determining depth information in the stereo image based on reflected signals received by at least one second sensor while driving the vehicle;

extracting features from the stereo image having a first resolution to generate feature vectors;

increasing a resolution of the depth information having a second resolution according to the first resolution to generate a resized depth image;

fusing the feature vectors and the resized depth image using a plurality of convolutional layers of a convolutional neural network to generate fused feature vectors; and detecting at least one object included in the stereo image using the fused feature vectors.

17. The method of claim 16, wherein the second resolution is smaller than the first resolution.

* * * * *